United States Patent
Tsuji et al.

(10) Patent No.: US 12,123,315 B2
(45) Date of Patent: Oct. 22, 2024

(54) TURBOCHARGER

(71) Applicant: Mitsubishi Heavy Industries Marine Machinery & Equipment Co., Ltd., Nagasaki (JP)

(72) Inventors: Takeshi Tsuji, Nagasaki (JP); Hidetaka Nishimura, Nagasaki (JP)

(73) Assignee: MITSUBISHI HEAVY INDUSTRIES MARINE MACHINERY & EQUIPMENT CO., LTD., Nagasaki (JP)

( * ) Notice: Subject to any disclaimer, the term of this patent is extended or adjusted under 35 U.S.C. 154(b) by 0 days.

(21) Appl. No.: 18/032,041

(22) PCT Filed: Oct. 19, 2021

(86) PCT No.: PCT/JP2021/038526
§ 371 (c)(1),
(2) Date: Apr. 14, 2023

(87) PCT Pub. No.: WO2022/085660
PCT Pub. Date: Apr. 28, 2022

(65) Prior Publication Data
US 2023/0366329 A1 Nov. 16, 2023

(30) Foreign Application Priority Data
Oct. 22, 2020 (JP) ................. 2020-177660

(51) Int. Cl.
*F01D 25/18* (2006.01)
(52) U.S. Cl.
CPC .......... *F01D 25/18* (2013.01); *F05D 2220/40* (2013.01); *F05D 2240/50* (2013.01); *F05D 2260/602* (2013.01)

(58) Field of Classification Search
CPC .. F01D 25/18; F05D 2220/40; F05D 2240/50; F05D 2260/602
See application file for complete search history.

(56) References Cited

U.S. PATENT DOCUMENTS

| 7,108,488 | B2 * | 9/2006 | Larue ................ F16C 17/024 |
| | | | 384/106 |
| 8,757,885 | B2 * | 6/2014 | Hornbach ............. F01D 25/16 |
| | | | 384/316 |

(Continued)

FOREIGN PATENT DOCUMENTS

| JP | S56-173724 U | 12/1981 |
| JP | S59-141721 A | 8/1984 |

(Continued)

OTHER PUBLICATIONS

International Search Report dated Dec. 28, 2021, issued in counterpart International application No. PCT/P2021/038526, with English translation. (13 pages).

(Continued)

*Primary Examiner* — David E Sosnowski
*Assistant Examiner* — Theodore C Ribadeneyra
(74) *Attorney, Agent, or Firm* — WHDA, LLP

(57) ABSTRACT

A turbocharger includes: a bearing; a casing for accommodating the bearing; and a first thermometer including a first temperature sensor for measuring temperature of lubricant oil. The casing includes a lubricant oil discharge part having a lubricant oil outlet for discharging the lubricant oil from the turbocharger. The lubricant oil discharge part includes a lubricant oil storage part for storing the lubricant oil. The first temperature sensor is disposed in the lubricant oil storage part.

24 Claims, 15 Drawing Sheets

(56) References Cited

U.S. PATENT DOCUMENTS

| | | | | |
|---|---|---|---|---|
| 11,236,783 B2* | 2/2022 | Nishii | .................... | F16C 17/02 |
| 2009/0112507 A1* | 4/2009 | Edney | ................ | G01N 33/2888 |
| | | | | 702/136 |
| 2012/0014782 A1* | 1/2012 | Petitjean | ................ | F01D 25/14 |
| | | | | 415/170.1 |
| 2017/0350841 A1* | 12/2017 | Chana | ................ | G01N 33/2847 |
| 2018/0238227 A1 | 8/2018 | Wood et al. | | |
| 2018/0347455 A1* | 12/2018 | Noda | .................... | F16C 33/66 |
| 2018/0363501 A1* | 12/2018 | Noda | .................... | F01D 25/20 |

FOREIGN PATENT DOCUMENTS

| | | |
|---|---|---|
| JP | S59-162320 A | 9/1984 |
| JP | S60-027730 A | 2/1985 |
| JP | H04-104106 U | 9/1992 |
| JP | 2018-170831 A | 11/2018 |

OTHER PUBLICATIONS

Notification of Transmittal of Translation of the International Preliminary Report on Patentability (Form PCT/IB/338) issued in counterpart International application No. PCT/JP2021/038526 mailed May 4, 2023 with Forms PCT/IB/373 and PCT/ISA/237. (12 pages).

* cited by examiner

TURBOCHARGER

TECHNICAL FIELD

The present disclosure relates to a turbocharger.

The present application claims priority based on Japanese Patent Application No. 2020-177660 filed on Oct. 22, 2020, the entire content of which is incorporated herein by reference.

BACKGROUND ART

The temperature of lubricant oil at a lubricant oil outlet of a turbocharger is one of barometers that can monitor the state of bearings of the turbocharger. For this reason, conventionally, a thermometer is often installed at the lubricant oil outlet of the turbocharger to measure the temperature of lubricant oil (see Patent Document 1, for example).

In this case, conventionally, a temperature sensor of the thermometer is placed in an oil outlet pipe for discharging lubricant oil from the turbocharger to measure the temperature of lubricant oil in the oil outlet pipe.

CITATION LIST

Patent Literature

Patent Document 1: JPS59-162320A

SUMMARY

Problems to be Solved

Since the oil outlet pipe of the turbocharger discharges mist air in a bearing pedestal of the turbocharger together with the lubricant oil, the cross-sectional area of the oil outlet pipe is sized to discharge the air layer and oil layer even at the maximum lubricant oil flow rate. The flow rate of lubricant oil flowing through the turbocharger depends on the rotation speed of the turbocharger, temperature of the lubricant oil, pressure of the lubricant oil, and characteristics of the lubricant oil, etc. If the back pressure downstream of the oil outlet pipe is high, the flow rate of lubricant oil is not constant and may move like pulsation. When the thermometer in the oil outlet pipe is affected by these various factors and comes into contact not only with oil but also with air (when the pipe is not oil-tight), the temperature measured by the thermometer becomes unstable, resulting in a reduction in measurement accuracy.

In view of the above, an object of the present disclosure is to provide a turbocharger that can accurately measure the outlet temperature of lubricant oil.

Solution to the Problems

In order to achieve the above-described object, a turbocharger according to at least one embodiment of the present disclosure includes a bearing, a casing for accommodating the bearing, and a first thermometer including a first temperature sensor for measuring the temperature of lubricant oil. The casing includes a lubricant oil discharge part having a lubricant oil outlet for discharging the lubricant oil from the turbocharger. The lubricant oil discharge part includes a lubricant oil storage part for storing the lubricant oil. The first temperature sensor is disposed in the lubricant oil storage part.

Advantageous Effects

According to the present disclosure, it is possible to provide a turbocharger that can accurately measure the outlet temperature of lubricant oil.

DETAILED DESCRIPTION

Figure 1:
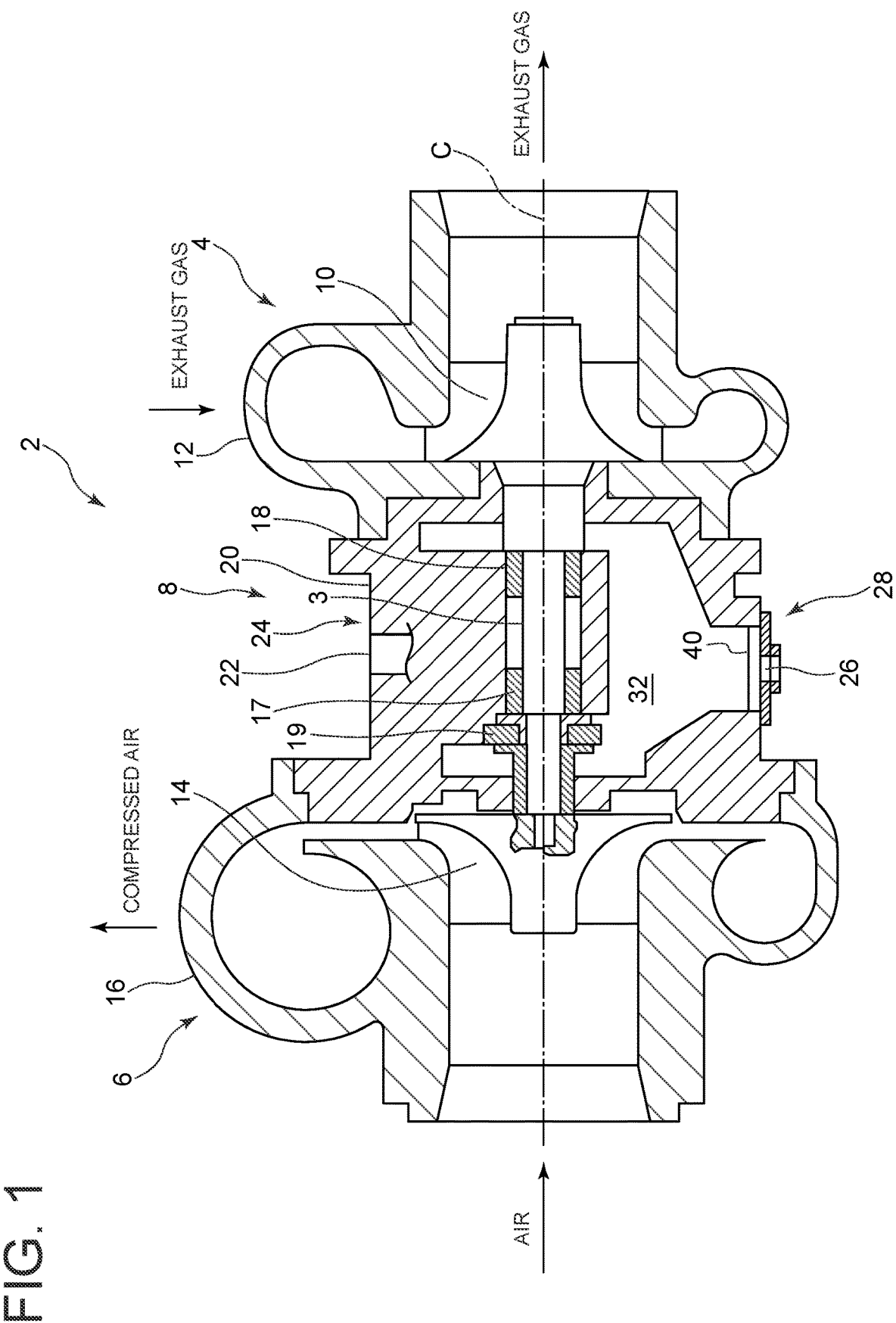
FIG. 1 is a cross-sectional view showing a schematic configuration of a turbocharger 2 according to an embodiment, which shows a cross-section along the rotational axis C of a shaft 3 of the turbocharger 2.

Embodiments of the present disclosure will be described below with reference to the accompanying drawings. It is intended, however, that unless particularly identified, dimensions, materials, shapes, relative positions and the like of components described or shown in the drawings as the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

FIG. 1 is a cross-sectional view showing a schematic configuration of a turbocharger 2 according to an embodiment, which shows a cross-section along the rotational axis C of a shaft 3 of the turbocharger 2.

As shown in FIG. 1, the turbocharger 2 includes a turbine 4, a compressor 6, and a bearing device 8.

The turbine 4 includes a turbine wheel 10, and a turbine casing 12 for accommodating the turbine wheel 10.

The compressor 6 includes a compressor impeller 14, and a compressor casing 16 for accommodating the compressor impeller 14. The turbine wheel 10 and the compressor impeller 14 are connected by a shaft 3 and share the shaft 3. Therefore, the turbine wheel 10 and the compressor impeller 14 are configured to rotate integrally around the rotational axis C. As the turbine wheel 10 is rotated by exhaust gas supplied from an engine (not shown), the compressor impeller 14 rotates to compress the air and discharges the compressed air. Hereinafter, unless otherwise stated, the axial direction of the shaft 3 is referred to as simply "axial direction", and the radial direction of the shaft 3 is referred to as simply "radial direction", and the circumferential direction of the shaft 3 is referred to as simply "circumferential direction".

The bearing device 8 includes journal bearings 17, 18 which rotatably support the shaft 3, a thrust bearing 19 which restricts axial movement of the shaft 3, and a bearing pedestal 20 (bearing casing) which accommodates the journal bearings 17, 18 and the thrust bearing 19. In the illustrated example, the thrust bearing 19, the journal bearing 17, and the journal bearing 18 are arranged in order from the compressor impeller 14 in the axial direction.

The bearing pedestal 20 includes a lubricant oil receiving part 24 having a lubricant oil inlet 22 for receiving lubricant oil from the outside of the bearing pedestal 20 to the inside of the bearing pedestal 20, and a lubricant oil discharge part 28 having a lubricant oil outlet 26 for discharging lubricant oil from the inside of the bearing pedestal 20 to the outside of bearing pedestal 20, and supports the bearing 18. In the lubricant oil discharge part 28, lubricant oil is stored as will be described later, and an oil level 40 of the lubricant oil is formed. In the illustrated example, the lubricant oil inlet 22 is formed at the top of the bearing pedestal 20, and the lubricant oil outlet 26 is formed at the bottom of the bearing pedestal 20.

The lubricant oil inlet 22 and the lubricant oil outlet 26 are communicated through the interior space of the bearing pedestal 20. At least part of the lubricant oil entering the interior space of the bearing pedestal 20 from the lubricant oil inlet 22 is supplied to the journal bearing 17, the journal bearing 18, or the thrust bearing 19 to reduce friction with the shaft 3, and then is discharged from the lubricant oil outlet 26 through a cavity 32 formed in the bearing pedestal 20 below the shaft 3.

Figure 2:
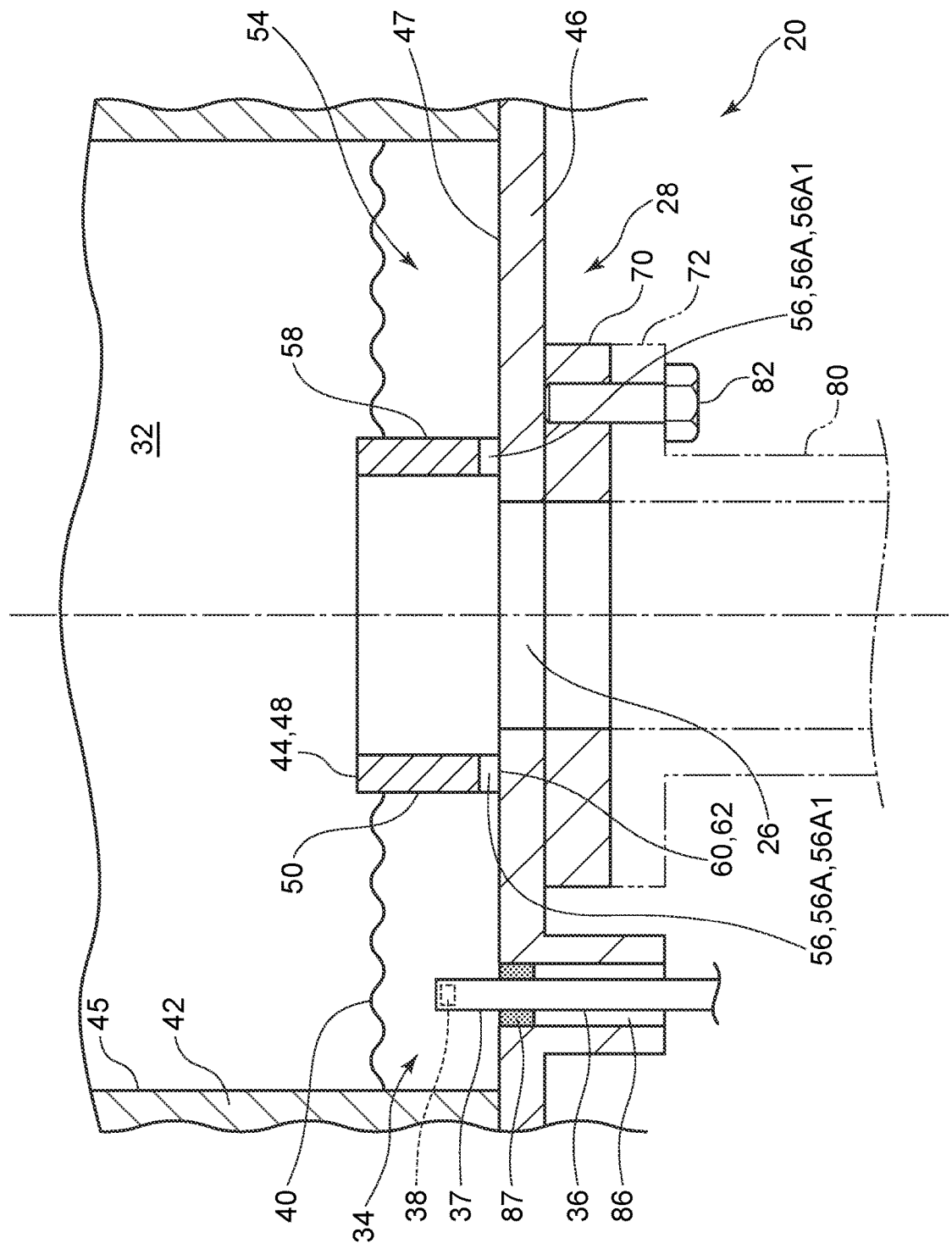
FIG. 2 is a schematic cross-sectional view showing a configuration example in the vicinity of the lubricant oil discharge part 28 in FIG. 1.

FIG. 2 is a schematic cross-sectional view showing a configuration example in the vicinity of the lubricant oil discharge part 28 in FIG. 1.

As shown in FIG. 2, the lubricant oil discharge part 28 of the bearing pedestal 20 includes a lubricant oil storage part 34 for storing the lubricant oil. Further, the turbocharger 2 includes a thermometer 36. The thermometer 36 includes a probe 37, and the tip of the probe 37 is provided with a temperature sensor 38 (temperature sensing element) for measuring the temperature of the lubricant oil.

The thermometer 36 may be, for example, an electric oil thermometer, which converts lubricant oil temperature information into an electric signal via a conductive wire (not shown) connected to the temperature sensor 38. The probe 37 of the thermometer 36 is inserted into the lubricant oil storage part 34 through a mounting hole 86 formed in a bottom lid 46, which will be described later. At least a part of the temperature sensor 38 of the thermometer 36 is disposed in the lubricant oil storage part 34. The tip of the probe 37 is disposed below the oil level 40 of the lubricant oil stored in the lubricant oil storage part 34, so the temperature sensor 38 of the thermometer 36 is disposed below the oil level 40 of the lubricant stored in the lubricant oil storage part 34. An annular seal member 87 may be provided between the inner peripheral surface of the mounting hole 86 and the outer peripheral surface of the probe 37 to suppress leakage of the lubricant oil. The seal member 87 may be, for example, a tapered thread (a tapered airtight thread).

The lubricant oil discharge part 28 includes a casing part 45 of substantially cylindrical shape which forms the cavity 32 along the vertical direction below the shaft 3 (see FIG. 1), and a bottom lid 46 (the bottom wall of the lubricant oil discharge part 28) which covers an opening formed at the lower end of the casing part 45. The lubricant oil storage part 34 includes a protruding pipe 48 that protrudes upward from an upper surface 47 of the bottom lid 46. The protruding pipe 48 is connected from above to the lubricant oil outlet 26 formed in the bottom lid 46 and protrudes upward from the lubricant oil outlet 26.

The lubricant oil storage part 34 is configured to store lubricant oil between an outer peripheral surface 50 of the protruding pipe 48 and an inner peripheral surface 42 of the lubricant oil discharge part 28. More specifically, the lubricant oil storage part 34 is an annular recess 54 formed by the outer peripheral surface 50 of the protruding pipe 48, the inner peripheral surface 42 of the casing part 45, and the upper surface 47 of the bottom lid 46, and is configured to store lubricant oil in the annular recess 54. The temperature sensor 38 at the tip of the probe 37 is disposed in the annular recess 54. In the illustrated example, the tip of the probe 37 is disposed below the tip of the protruding pipe 48 (the upper end of the protruding pipe 48) so that the tip of the probe 37 is below the oil level 40. The recess 54 needs not be annular. In other words, the cross-section of the outer peripheral surface 50 and the cross-section of the inner peripheral surface 42 need not be circular, but may be other shapes, such as a rectangle (square), for example.

As shown in FIG. 2, the lubricant oil storage part 34 includes a plurality of oil drain holes 56 for discharging the lubricant oil from the lubricant oil storage part 34 to the lubricant oil outlet 26. Each of the oil drain holes 56 penetrates a wall surface 58 of the protruding pipe 48. The plurality of oil drain holes 56 includes a plurality of lower oil drain holes 56A provided in a lower portion 60 of the protruding pipe 48. The lower oil drain holes 56A are arranged at intervals in the circumferential direction of the protruding pipe 48, and each of the lower oil drain holes 56A penetrates the wall surface 58 of the protruding pipe 48. The number of lower oil drain holes 56A formed in the protruding pipe 48 is not particularly limited. For example, a total of four lower oil drain holes 56A may be provided in the protruding pipe 48 at intervals of 90 degrees.

In the example shown in FIG. 2, a flange 70 is disposed on a lower surface of a bottom lid 46 for connecting a flange 72 of an oil outlet pipe 80, and the flange 70 at the bottom lid 46 and the flange 72 at the oil outlet pipe 80 are connected by a plurality of bolts 82. The lubricant oil stored in the lubricant oil storage part 34 is discharged to the oil outlet pipe 80 via the lower oil drain holes 56A, the inside of the protruding pipe 48, and the lubricant oil outlet 26.

With the configuration shown in FIG. 2, since the temperature sensor 38 is disposed in the lubricant oil storage part 34, the lubricant oil stored in the lubricant oil storage part 34 prevents the temperature sensor 38 from being exposed to air. In other words, the temperature sensor 38 can be placed in an oil-tight condition. Thus, the outlet temperature of the lubricant oil in the turbocharger 2 can be measured stably and accurately. Further, with the lubricant oil storage part 34, the lubricant oil falls once and mixes in the lubricant oil storage part 34, equalizing the temperature of the entire lubricant oil to some extent. Therefore, unevenness in the temperature of the lubricant oil measured by the temperature sensor 38 can be suppressed, and the average temperature of the lubricant oil can be measured. For example, the temperature of the lubricant oil discharged from the turbine-side bearing 18 tends to be higher than the temperature of the lubricant oil discharged from the compressor-side bearings 17, 19, but even in such cases, the average temperature of the lubricant oil can be measured since the lubricant oil mixes in the lubricant oil storage part 34.

Further, as described above, by providing the lower oil drain holes 56A in the lower portion 60 of the protruding pipe 48, gravity can be used to effectively promote the replacement of the lubricant oil in the lubricant oil storage part 34. Therefore, it is possible to accurately measure the temperature of the lubricant oil which reflects the state of the journal bearings 17, 18 and the thrust bearing 19 of the turbocharger 2 well with a simple configuration.

In the example shown in FIG. 2, the plurality of lower oil drain holes 56A includes a plurality of lower end oil drain holes 56A1 provided at a lower end 62 of the protruding pipe 48. The lower end oil drain holes 56A1 are arranged at intervals in the circumferential direction of the protruding pipe 48, and each of the lower end oil drain holes 56A1 penetrates the wall surface 58 of the protruding pipe 48.

Thus, by providing the lower end oil drain holes 56A1 at the lower end 62 of the protruding pipe 48, the lubricant oil in the lubricant oil storage part 34 can be discharged through the lower end oil drain holes 56A1 when the operation of the turbocharger 2 is stopped, reducing residual lubricant oil in the lubricant oil storage part 34 when the operation of the turbocharger 2 is stopped. Therefore, when removing the bottom lid 46 from the lubricant oil storage part 34, it is possible to reduce the outflow of oil from the lubricant oil storage part 34. In addition to when removing the bottom lid 46, for example, when removing (replacing) the temperature sensor 38 or transporting the turbocharger 2, it is possible to reduce the outflow of oil from the lubricant oil storage part 34.

If the lower oil drain holes 56A are not provided at the lower end 62 of the protruding pipe 48, old lubricant oil may remain at the bottom of the lubricant oil storage part 34. If old lubricant oil remains at the bottom, there is a concern that the accuracy of lubricant oil temperature measurement will be reduced, and that when a ship is in motion, etc., the deteriorated lubricant oil remaining at the bottom will circulate throughout a lubricant oil line, affecting bearing lubrication and other functions. In contrast, by providing the lower oil drain holes 56A at the lower end 62 of the protruding pipe 48, old lubricant oil is prevented from remaining at the bottom of the lubricant oil storage part 34, eliminating the above concerns.

Figure 3:
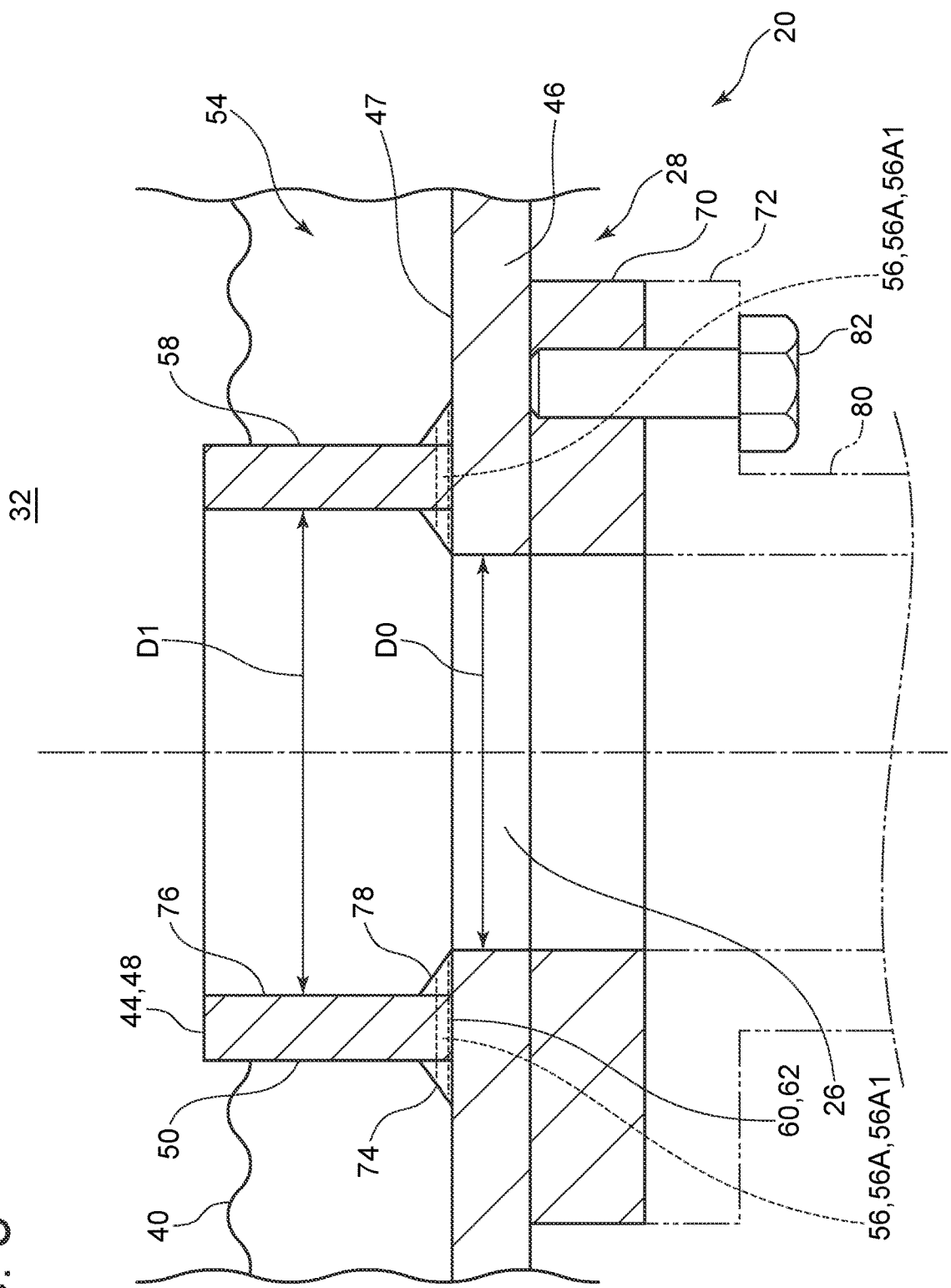
FIG. 3 is a schematic cross-sectional view showing an example of a detailed configuration in the vicinity of the lubricant oil discharge part 28 shown in FIG. 2.
Figure 4:
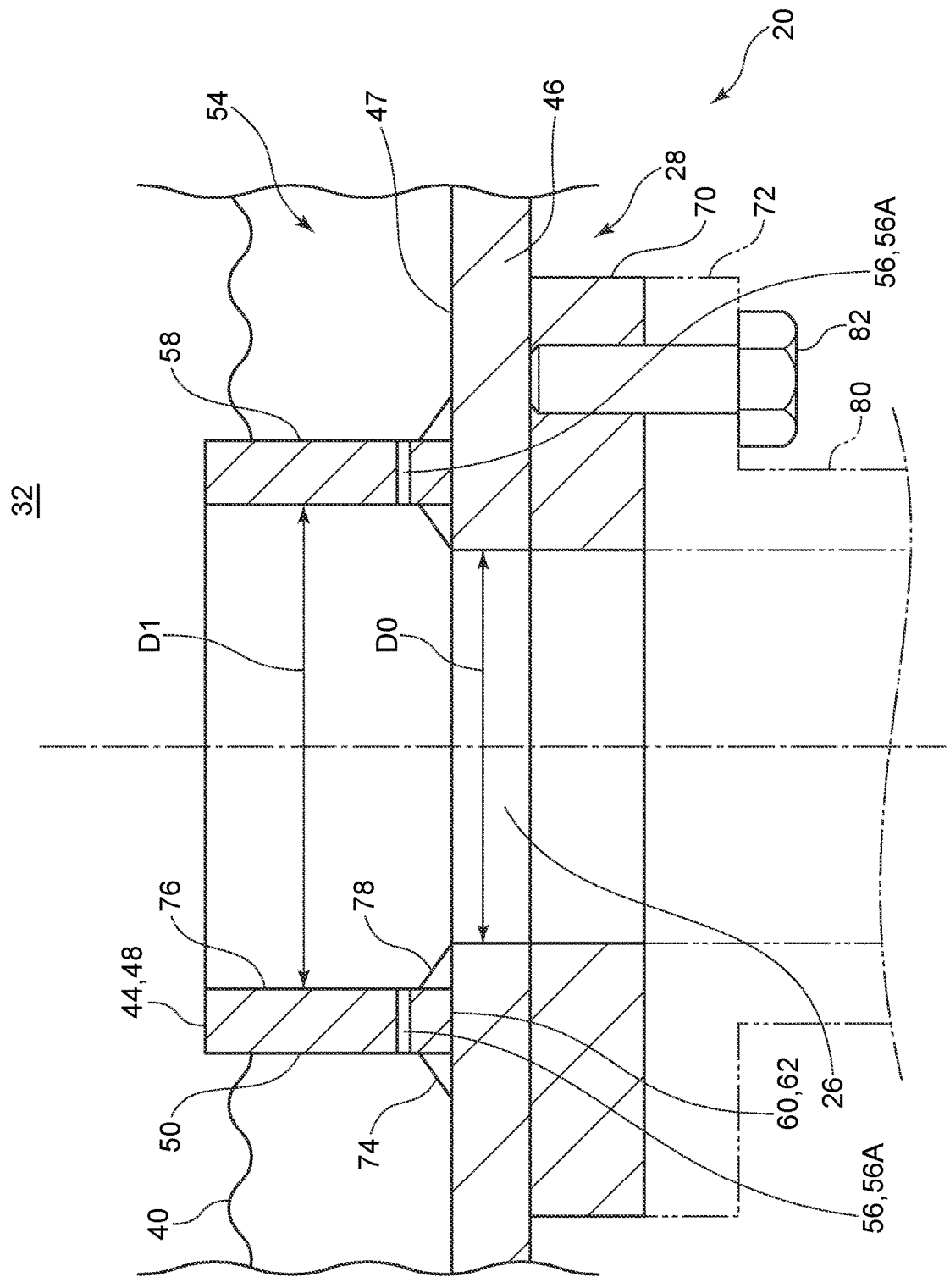
FIG. 4 is a schematic cross-sectional view showing another example of a detailed configuration in the vicinity of the lubricant oil discharge part 28 shown in FIG. 2.
Figure 5:
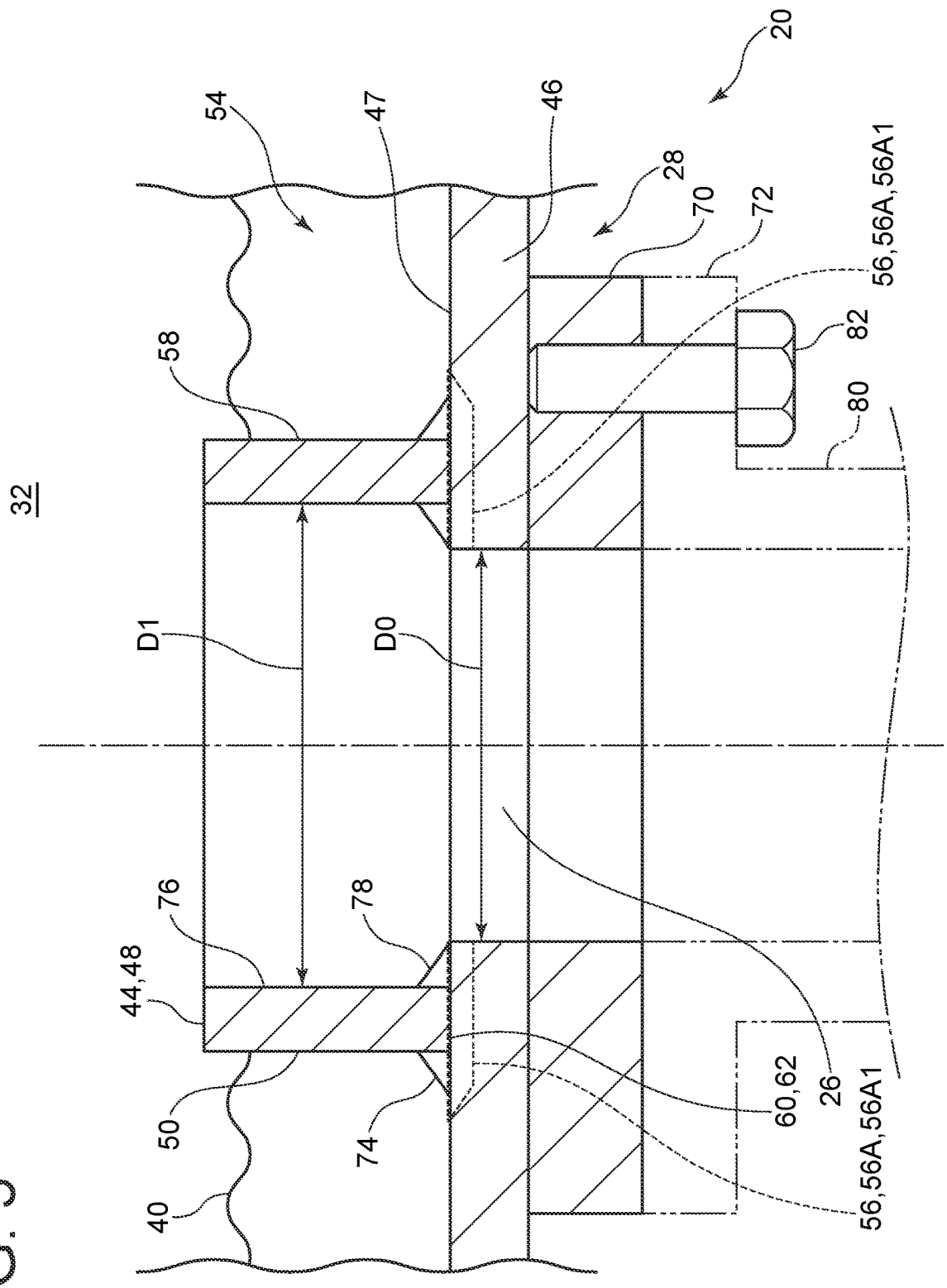
FIG. 5 is a schematic cross-sectional view showing another example of a detailed configuration in the vicinity of the lubricant oil discharge part 28 shown in FIG. 2.
Figure 6:
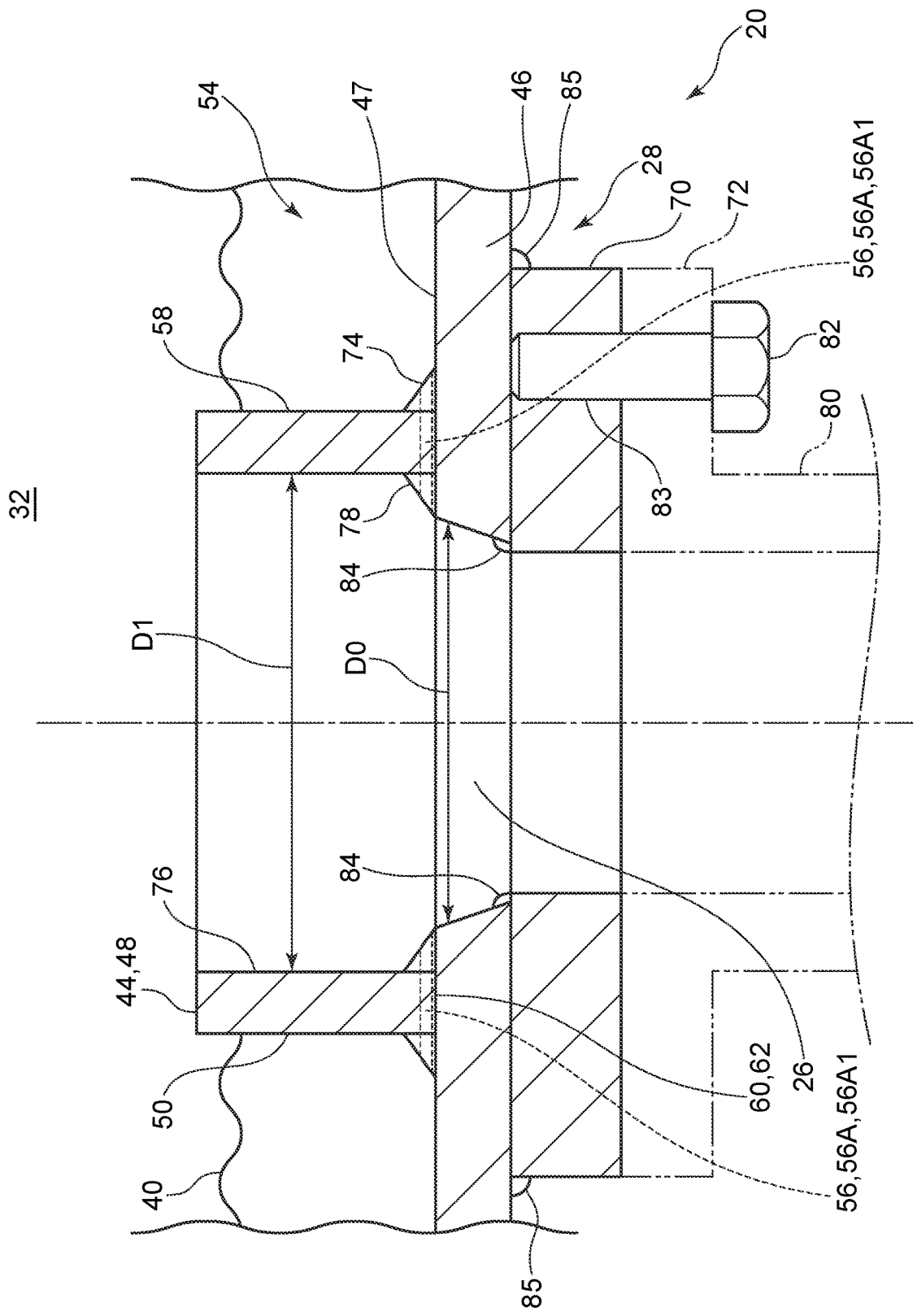
FIG. 6 is a schematic cross-sectional view showing another example of a detailed configuration in the vicinity of the lubricant oil discharge part 28 shown in FIG. 2.

FIG. 3 is a schematic cross-sectional view showing an example of a detailed configuration of a portion in the vicinity of the lubricant oil discharge part 28 shown in FIG. 2. FIG. 4 is a schematic cross-sectional view showing another example of a detailed configuration of a portion in the vicinity of the lubricant oil discharge part 28 shown in FIG. 2. FIG. 5 is a schematic cross-sectional view showing another example of a detailed configuration of a portion in the vicinity of the lubricant oil discharge part 28 shown in FIG. 2. FIG. 6 is a schematic cross-sectional view showing another example of a detailed configuration of a portion in the vicinity of the lubricant oil discharge part 28 shown in FIG. 2. In some embodiments described below, unless otherwise stated, common reference characters with those in the aforementioned configurations denote the same constituent components as those in the aforementioned configurations, and the description thereof will be omitted.

In some embodiments, for example, as shown in FIGS. 3 to 6, the proximal end portion of the protruding pipe 48 may be secured to the upper surface 47 of the bottom lid 46 by welding. In the illustrated example, the lubricant oil discharge part 28 includes a weld portion 74 (weld metal) connecting the outer peripheral surface 50 of the protruding pipe 48 and the upper surface 47 of the bottom lid 46, the protruding pipe 48, and a weld portion 78 (weld metal) connecting the inner peripheral surface 76 of the protruding pipe 48 and the upper surface of the bottom lid 46.

In this case, for example, as shown in FIG. 3, the above-described lower oil drain holes 56A (or lower end oil drain holes 56A1) may be formed to penetrate the weld portion 74, the protruding pipe 48, and the weld portion 78 in this order. As a result, since the lower oil drain holes 56A can be formed in lower positions, the replacement of the lubricant oil in the lubricant oil storage part 34 can be effectively promoted, and the lubricant oil in the lubricant oil storage part 34 can be almost completely emptied when the operation of the turbocharger 2 is stopped.

Alternatively, for example, as shown in FIG. 4, the lower oil drain holes 56A may be formed above the weld portions 74, 78 to avoid the weld portions 74, 78. This reduces damage to the weld portions 74, 78 and increases the strength of the joint between the protruding pipe 48 and the bottom lid 46.

For example, as shown in FIG. 5, the lower end oil drain holes 56A1 may be formed to gouge the upper surface 47 of the bottom lid 46. In the example shown in FIG. 5, the lower end oil drain holes 56A1 are formed along the lower end of the weld portion 74, the boundary between the protruding pipe 48 and the bottom lid 46, and the weld portion 78. Thus, it is possible to discharge the oil more efficiently through the lower end oil drain holes 56A1.

Further, for example, as shown in FIG. 6, the inner diameter D1 of the protruding pipe 48 may be larger than the diameter D0 of the lubricant oil outlet 26. In the case where the inner peripheral surface of the lubricant oil outlet 26 formed in the bottom lid 46 contracts downward as shown in FIG. 6, the diameter DO of the lubricant oil outlet 26 means the diameter at the upper end of the lubricant oil outlet 26. The configuration shown in FIG. 6 has a weld portion 84 connecting the lower end of the lubricant oil outlet 26 in the bottom lid 46 to the upper surface of the flange 70, and a weld portion 85 connecting the lower surface of the bottom lid 46 to the outer peripheral surface of the flange 70.

Figure 7:
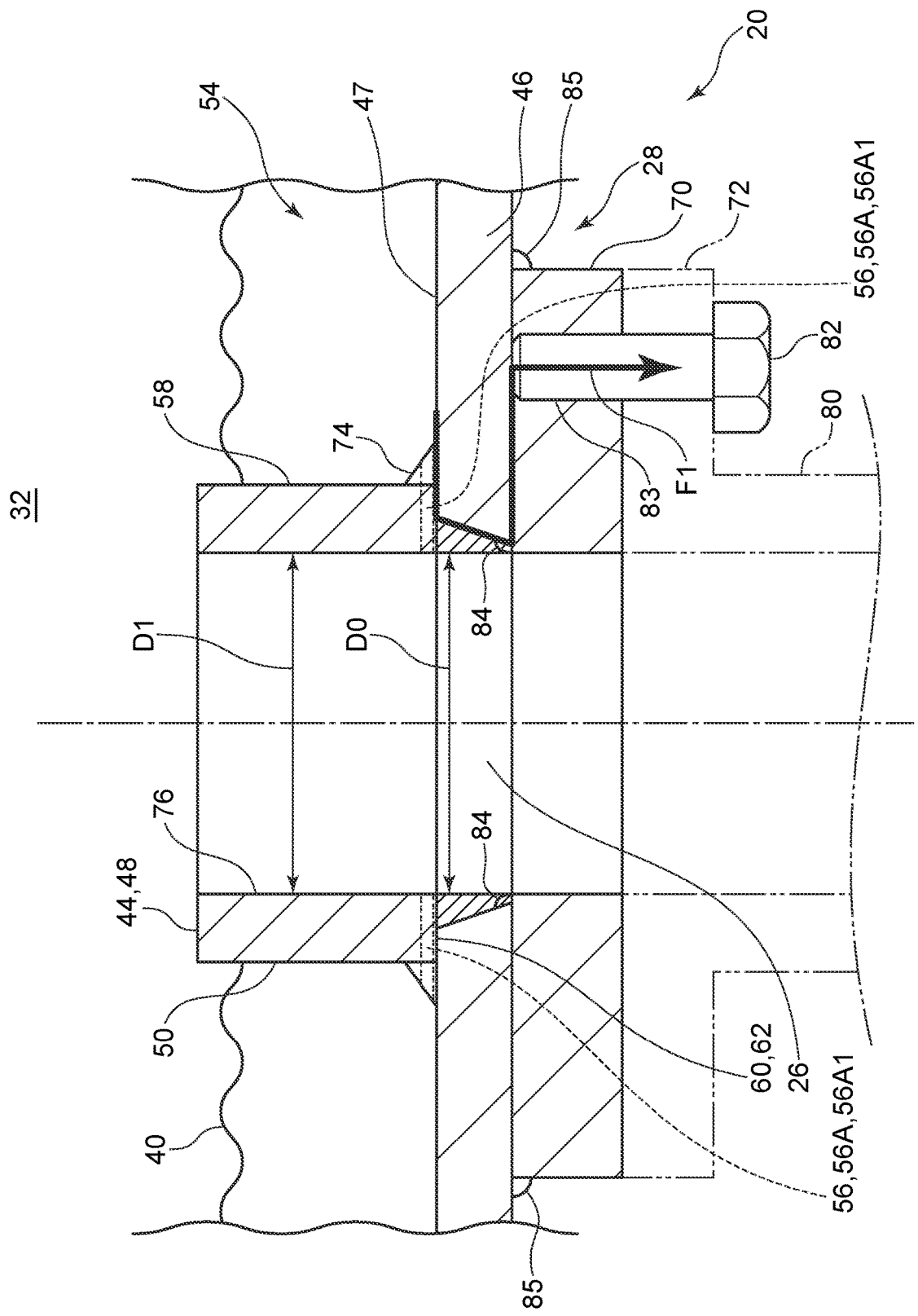
FIG. 7 is a schematic cross-sectional view showing the case where the inner diameter of the protruding pipe 48 is smaller than the diameter of the lubricant oil outlet 26.

If the inner diameter D1 of the protruding pipe 48 is equal to or smaller than the diameter DO of the lubricant oil outlet 26 as shown in FIG. 7, when the lower end oil drain hole 56A1 is provided closer to the bottom lid 46 in the protruding pipe 48, the lubricant oil may leak out through a path in the weld portions 74, 84 (a path between the lower end of the protruding pipe 48 and the bottom lid 46 and between the bottom lid 46 and the flange 70) and a bolt hole 83 in the flange 70, as indicated by the arrow F1.

In contrast, if the inner diameter D1 of the protruding pipe 48 is larger than the diameter DO of the lubricant oil outlet 26 as shown in FIG. 6, the lower end of the protruding pipe 48 is located horizontally away from the weld portion 84, reducing the possibility that the lubricant oil leaks as indicated by the arrow F1 in FIG. 7.

In some embodiments, for example, in any one of the configurations shown in FIGS. 3 to 6, the total cross-sectional area (passage cross-sectional area) of all the lower oil drain holes 56A formed in the protruding pipe 48 is smaller than the cross-sectional area (passage cross-sectional area) of the lubricant oil outlet 26. For example, when fourth lower oil drain holes 56 are formed in the protruding pipe 48, the total cross-sectional area of the four lower oil drain holes 56A is smaller than the cross-sectional area of the lubricant oil outlet 26. Further, the total cross-sectional area of all the lower oil drain holes 56A formed in the protruding pipe 48 is such that the flow rate of the lubricant oil flowing through all the lower oil drain holes 56A in the protruding pipe 48 is equal to or less than 70% of the minimum flow rate of the lubricant oil supplied to the turbocharger 2 during operation of the turbocharger 2 (the lower limit value of the flow rate of the lubricant oil supplied to the lubricant oil inlet 22 during operation of the turbocharger 2).

With this configuration, even when the flow rate of the lubricant oil supplied to the turbocharger 2 is the minimum flow rate, lubricant oil can be stored in the lubricant oil storage part 34, and the outlet temperature of the lubricant oil in the turbocharger 2 can be measured stably and accurately by the thermometer 36 (see FIG. 2) with the temperature sensor 38 disposed in the lubricant oil storage part 34.

Figure 8:
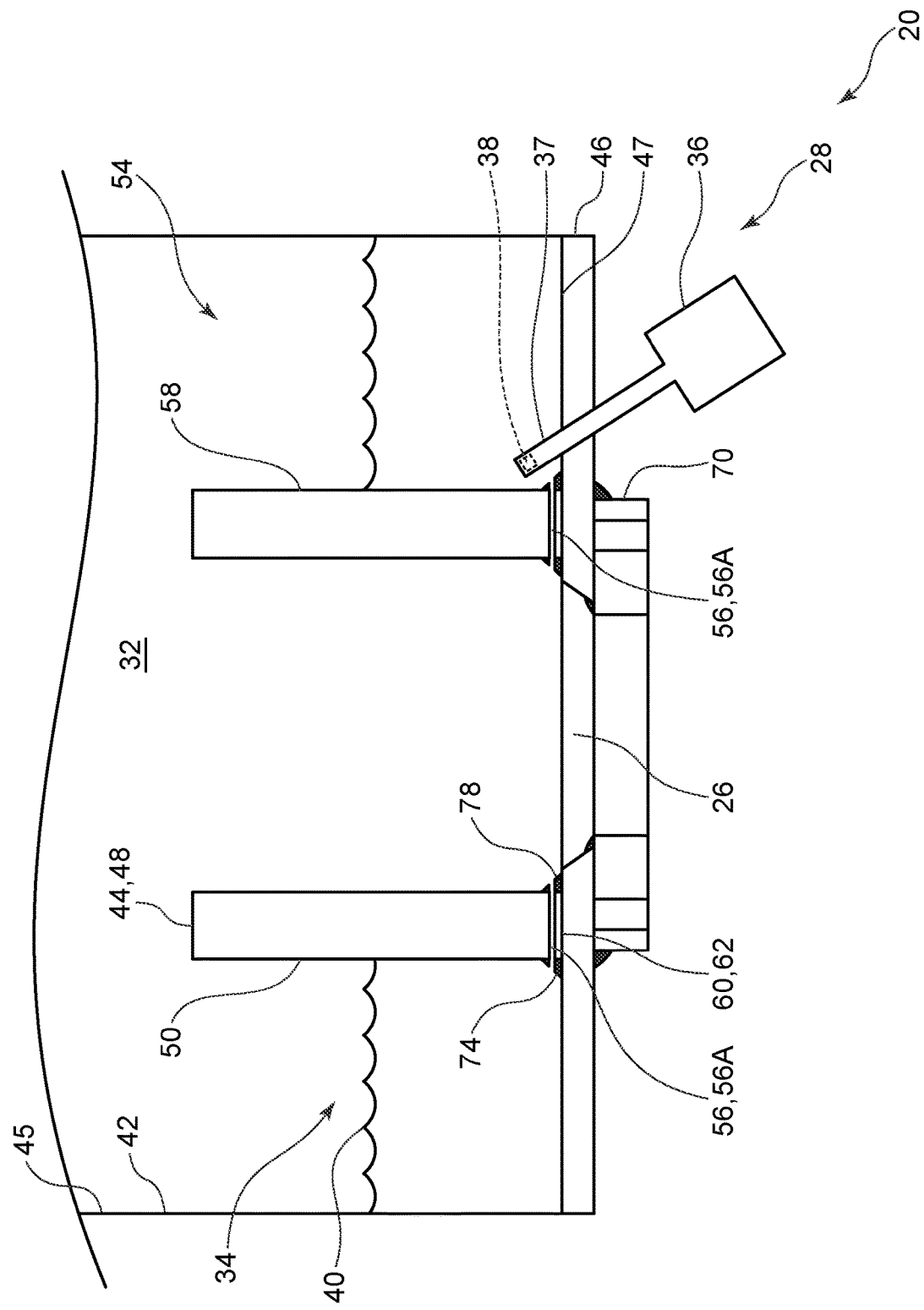
FIG. 8 is a schematic cross-sectional view showing another configuration example in the vicinity of the lubricant oil discharge part 28 in FIG. 1.

In some embodiments, for example, as shown in FIG. 8, the thermometer 36 is arranged with the tip side of the probe 37 tilted toward the protruding pipe 48 with respect to the vertical direction. In the illustrated example, the thermometer 36 is installed on the bottom lid 46, with the longitudinal direction of the probe 37 inclined with respect to the vertical direction so that the distance from the protruding pipe 48 decreases as it extends from the bottom lid 46 upward (toward the tip of the probe 37 in the longitudinal direction of the thermometer 36).

With this configuration, the temperature sensor 38 of the thermometer 36 can be brought closer to the oil drain hole 56 in the protruding pipe 48 to measure the temperature of lubricant oil near the oil drain hole 56 (i.e., lubricant oil not stagnating in the lubricant oil storage part 34), while suppressing interference of the base end of the probe 37 (opposite the temperature sensor 38) with the flanges 70, 72 or the oil outlet pipe 80 (see FIGS. 2 to 6) connected to the lubricant oil outlet 26. Therefore, it is possible to accurately measure the temperature of the lubricant oil which reflects the state of the bearings 17 to 19 well, while suppressing interference of the base end of the thermometer 36 with the flange 72 or the oil outlet pipe 80 connected to the lubricant oil outlet 26.

Figure 9:
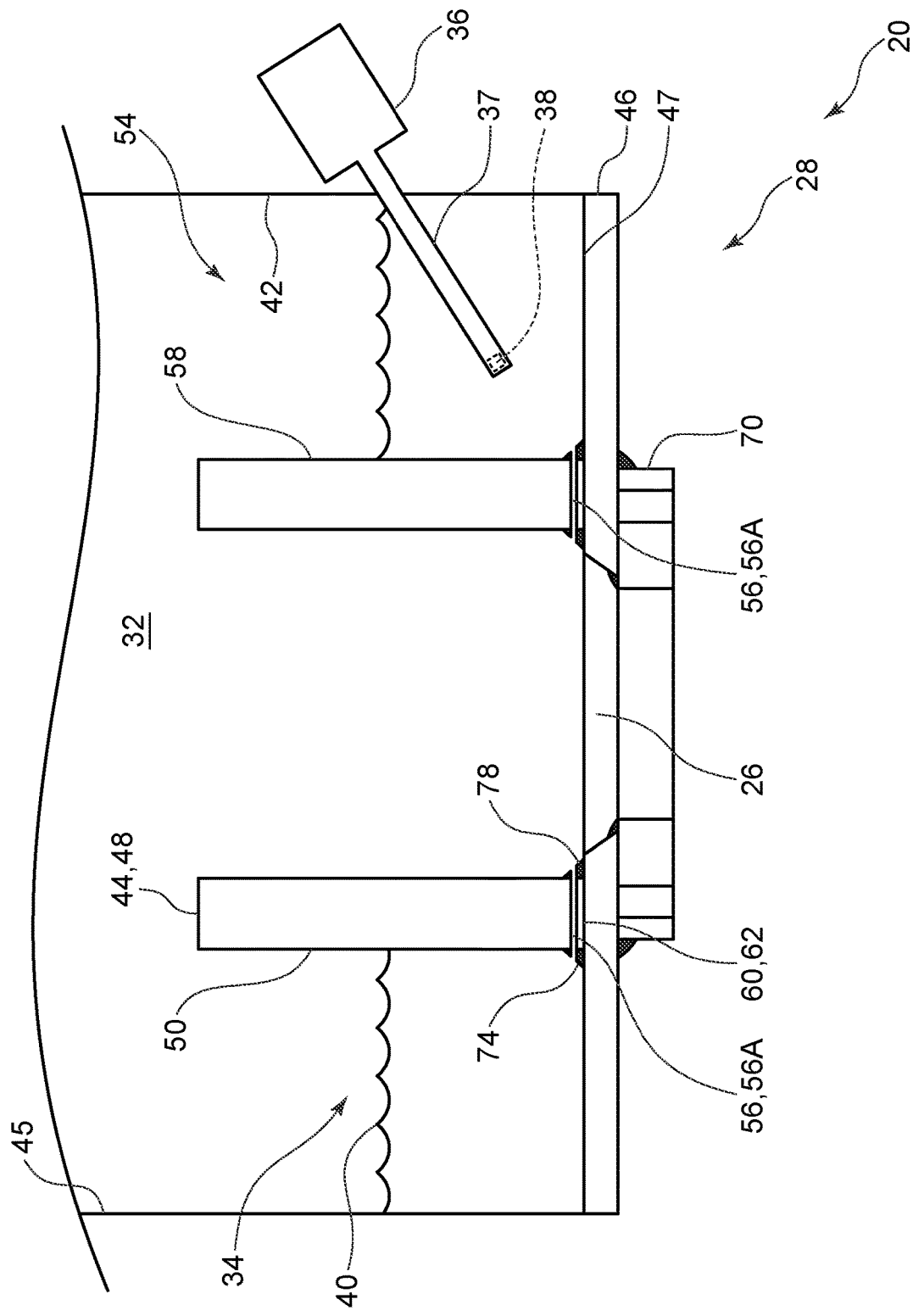
FIG. 9 is a schematic cross-sectional view showing another configuration example in the vicinity of the lubricant oil discharge part 28 in FIG. 1.

In some embodiments, for example, as shown in FIG. 9, the thermometer 36 is arranged with the tip side of the probe 37 tilted toward the protruding pipe 48 with respect to the vertical direction. In the illustrated example, the thermometer 36 is installed on the inner peripheral surface 42 of the casing part 45, with the longitudinal direction of the probe 37 inclined with respect to the vertical direction so that the distance from the protruding pipe 48 decreases as it extends from the inner peripheral surface 42 of the casing part 45 downward (toward the temperature sensor 38 in the longitudinal direction of the probe 37).

With this configuration, the temperature sensor 38 of the thermometer 36 can be brought closer to the oil drain hole 56 in the protruding pipe 48 to measure the temperature of the lubricant oil near the oil drain hole 56 (i.e., the lubricant oil not stagnating in the lubricant oil storage tank 34), while preventing interference of the base end of the probe 37 (opposite the temperature sensor 38) with the flanges 70, 72 or the oil outlet pipe 80 (see FIGS. 2 to 6) connected to the lubricant oil outlet 26. Therefore, it is possible to accurately measure the temperature of the lubricant oil which reflects the state of the bearings 17 to 19 well, while suppressing interference of the base end of the thermometer 36 with the flange 72 or the oil outlet pipe 80 connected to the lubricant oil outlet 26 or a structure such as a support (not shown) of the turbocharger 2. Further, compared to the configuration in which the probe 37 of the thermometer 36 is inserted into the lubricant oil storage part 34 through the mounting hole in the bottom lid 46 (e.g., the configuration shown in FIG. 8), it is possible to reduce the possibility that the lubricant oil remaining on the bottom lid 46 of the lubricant oil storage part 34 leaks out through the mounting hole of the thermometer 36 when the thermometer 36 is removed from the lubricant oil storage part 34. Further, as described above, suppressing interference of the base end of the thermometer 36 with the flange 72 or the oil outlet pipe 80 connected to the lubricant oil outlet 26 or a structure such as a support (not shown) of the turbocharger 2 makes it easy to mount the thermometer 36 on the casing part 45.

When the turbocharger 2 is, for example, a marine turbocharger, it is desirable that the temperature sensor 38 at the tip of the probe 37 is disposed below the oil level 40 of the lubricant oil in the lubricant oil storage part 34 even when the turbocharger 2 is tilted at 22.5 degrees, which is a predetermined inclination angle specified by ship classification.

Figure 10:
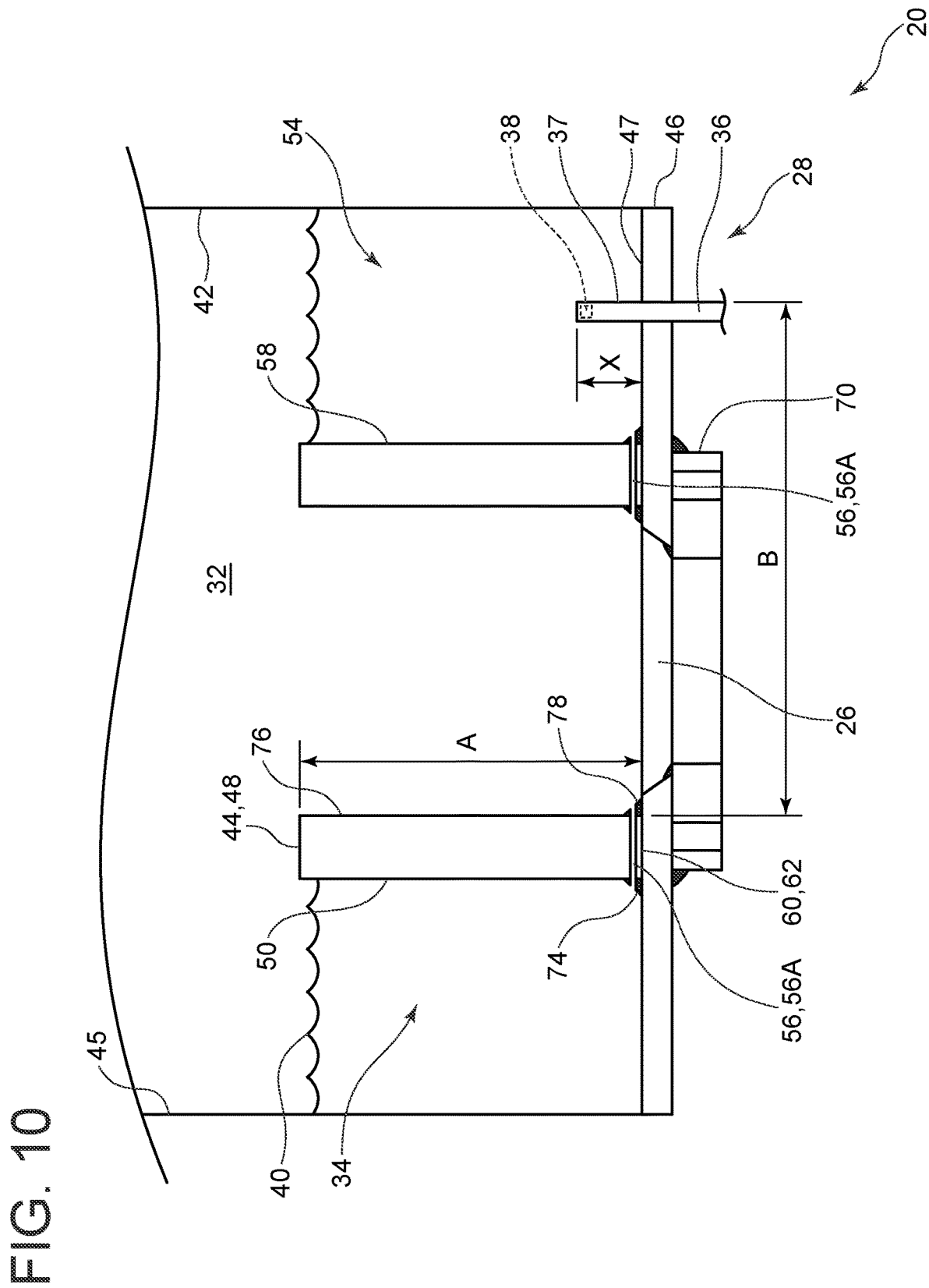
FIG. 10 is a schematic cross-sectional view for describing the height from the bottom lid 46 to the tip of the probe 37, etc.
Figure 11:
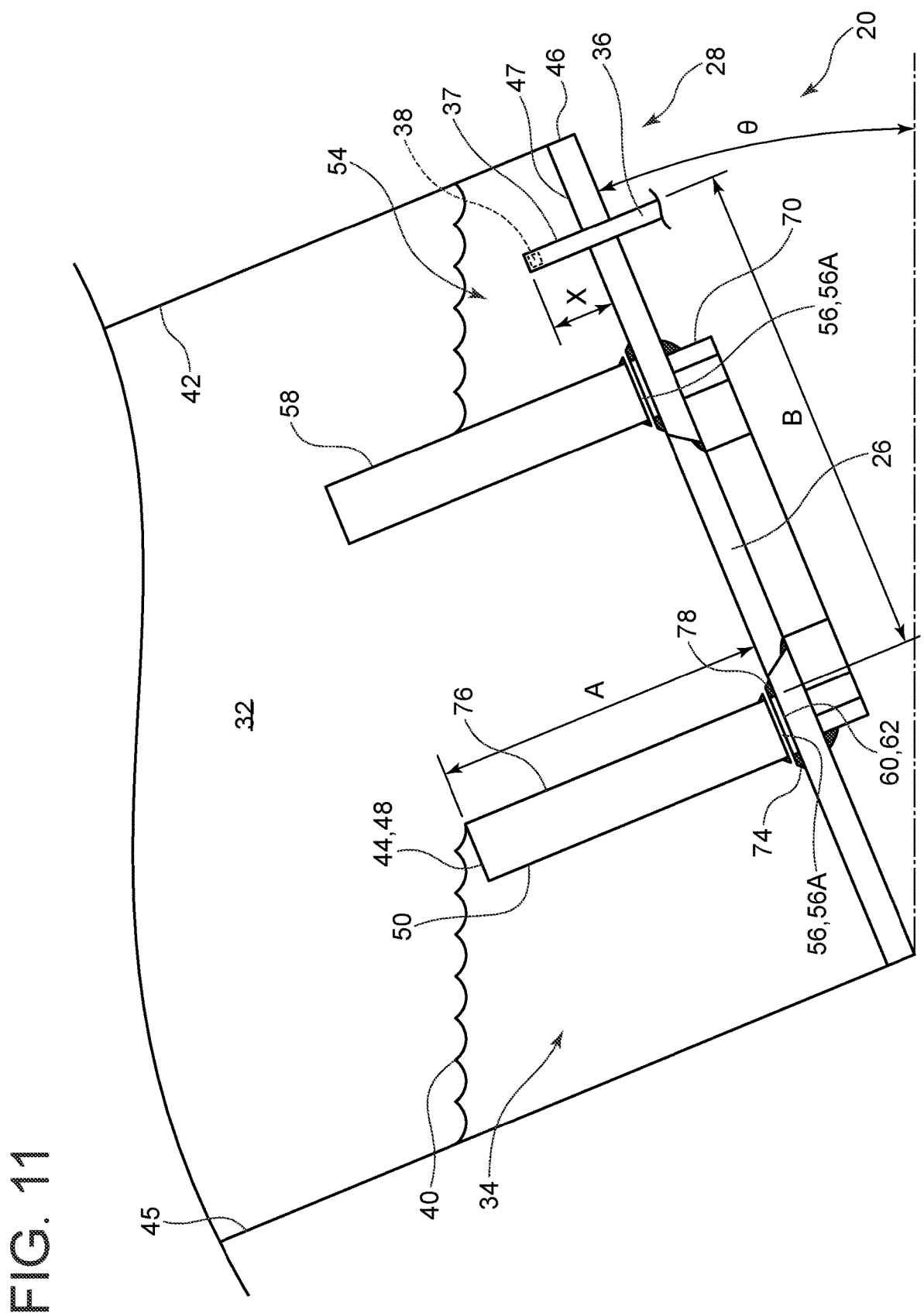
FIG. 11 is a diagram showing a state where the configuration shown in FIG. 10 is tilted at angle θ with respect to the horizontal direction.

For example, as shown in FIG. 10, assuming that X is the height from the bottom lid 46 of the lubricant oil storage part 34 to the tip of the probe 37 of the thermometer 36, A is the height from the bottom lid 46 of the lubricant oil storage part 34 to the tip of the protruding pipe 48, and B is the distance between the inner peripheral surface 76 of the protruding pipe 48 and the probe 37 at the position furthest from the thermometer 36 in the circumferential direction of the protruding pipe 48, when the turbocharger 2 is tilted at angle θ with respect to the horizontal direction, the position of the oil level 40 of the lubricant oil in the lubricant oil storage part 34 is as shown in FIG. 11. Here, assuming that the angle θ is the maximum inclination angle specified by ship classification or the maximum inclination angle conceivable in design of a ship or an engine, whichever is greater, the tip of the thermometer 36 can be disposed below the oil level 40 when the following expression (a) is satisfied. The angle θ may be, for example, 22.5 degrees.

$$X < A - B \tan \theta \tag{a}$$

Thus, the tip of the probe 37 of the thermometer 36 is prevented from being exposed to air, and the outlet temperature of the lubricant oil in the turbocharger 2 can be measured stably and accurately. The height position of the tip of the probe 37 and the height position of the protruding pipe 48 may be adjusted in consideration of oscillation of the oil level 40 due to external vibration.

Figure 12:
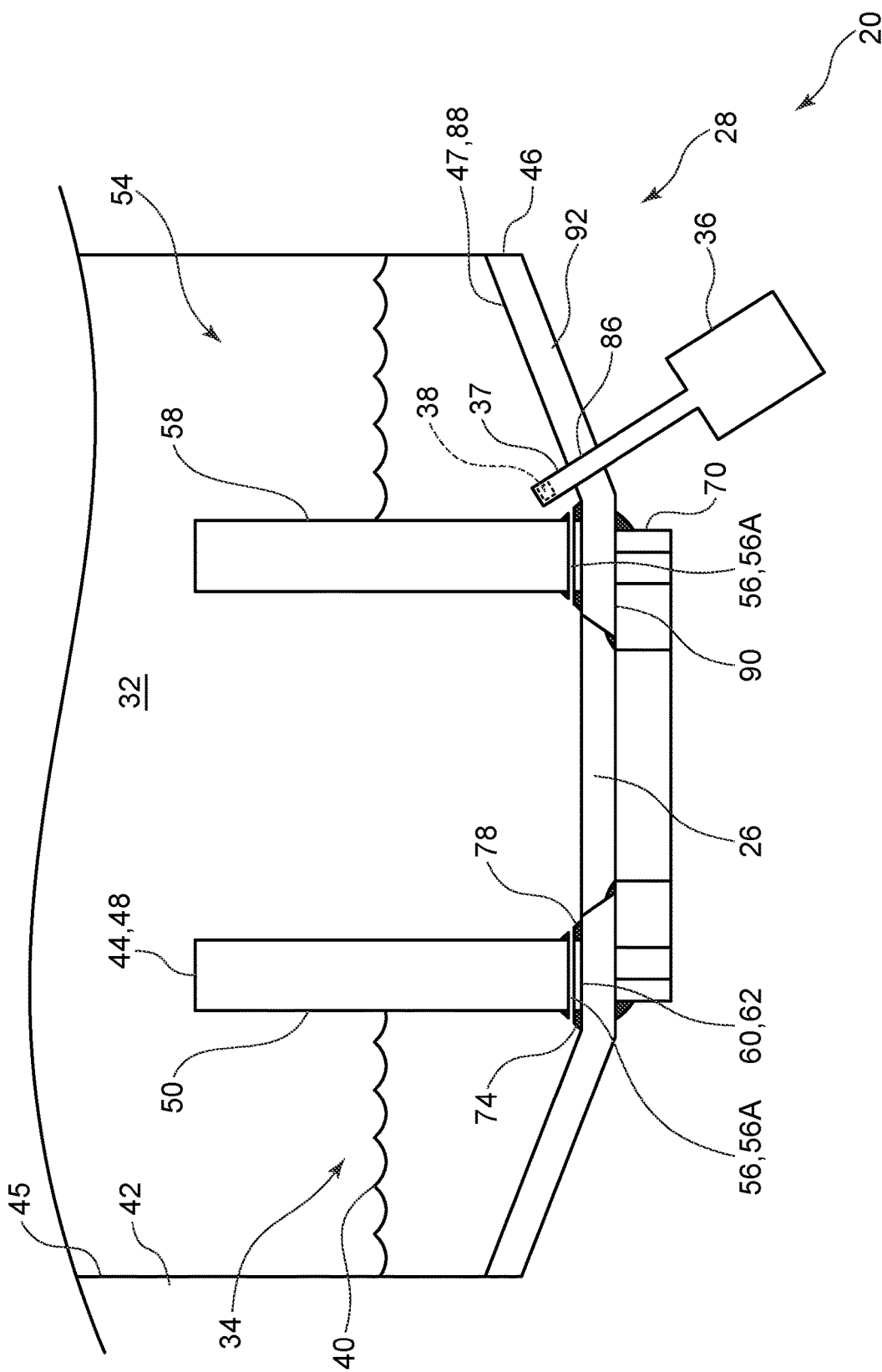
FIG. 12 is a schematic cross-sectional view showing another configuration example in the vicinity of the lubricant oil discharge part 28 in FIG. 1.

In some embodiments, for example as shown in FIG. 12, the upper surface 47 of the bottom lid 46 of the lubricant oil storage part 34 includes an inclined surface 88 that is inclined downward toward the protruding pipe 48.

In the configuration shown in FIG. 12, the upper surface of the bottom lid 46 is formed in a concave shape that is recessed downward in the vertical direction. The bottom lid 46 is formed in, for example, a substantially truncated cone shape, and includes an annular flat plate portion 90 with the lubricant oil outlet 26 formed in the center, and an annular inclined plate portion 92 connected to the outer periphery of the flat plate portion 90 and inclined upward with an increase in horizontal distance from the protruding pipe 48. The outer edge of the inclined plate portion 92 is connected to the lower end of the casing part 45, and the upper surface of the inclined plate portion 92 constitutes the inclined surface 88. The flange 70 is secured to the lower surface of the flat plate portion 90 by welding. The probe 37 of the thermometer 36 is inserted into the lubricant oil storage part 34 through a mounting hole 86 formed in the inclined plate portion 92. The thermometer 36 is arranged with the tip side of the probe 37 tilted toward the protruding pipe 48 with respect to the vertical direction. When the bottom lid 46 includes the inclined surface 88, the shape of the bottom lid 46 is not limited to a substantially truncated cone shape, but may be any other shape, such as a substantially truncated pyramid shape.

Since the lubricant oil can be guided along the inclined surface 88 to the oil drain hole 56 of the protruding pipe 48, the lubricant oil can be discharged more efficiently, and the replacement of the lubricant oil in the lubricant oil storage part 34 can be promoted. Thus, it is possible to accurately measure the temperature of the lubricant oil which reflects the state of the bearings 17 to 19 well. Further, since the remaining amount of lubricant oil in the lubricant oil storage part 34 can be close to empty when the operation of the turbocharger 2 is stopped, it is possible to suppress leakage of the lubricant oil when the bottom lid 46 is removed. In the configuration shown in FIG. 12, the bottom lid 46 is not limited to a truncated cone shape, but may be a truncated pyramid shape.

Figure 13:
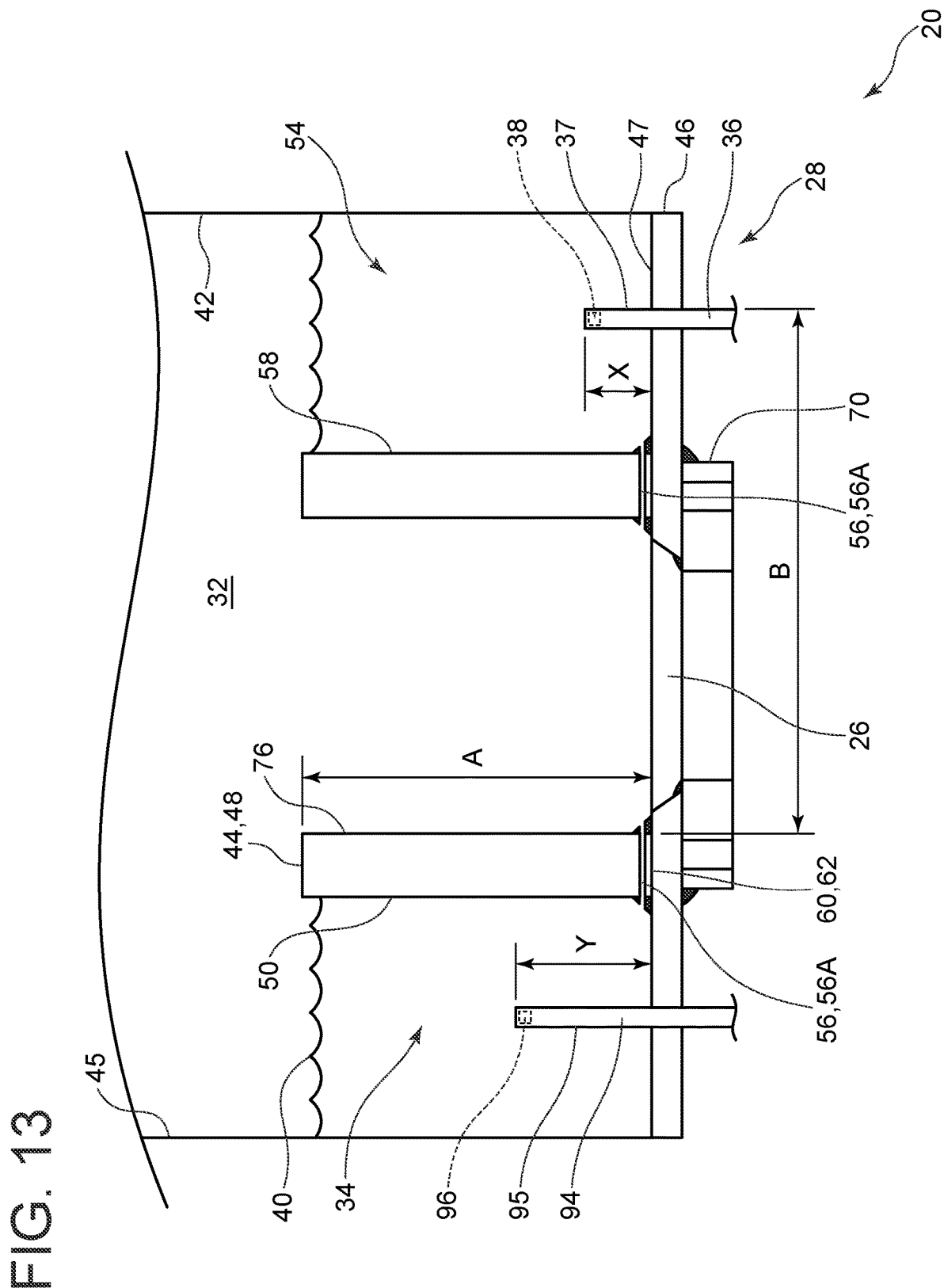
FIG. 13 is a schematic cross-sectional view showing another configuration example in the vicinity of the lubricant oil discharge part 28 in FIG. 1.

In some embodiments, for example, as shown in FIG. 13, the turbocharger further includes, in addition to the thermometer 36, a thermometer 94 configured to measure the temperature of the lubricant oil. In this case, the thermometer 94 is disposed at a different position from the thermometer 36 in the circumferential direction of the protruding pipe 48, and at least a part of the temperature sensor 38 of the thermometer 94 is disposed in the lubricant oil storage part 34.

The thermometer 94 has the same configuration as the thermometer 36. The thermometer 94 includes a probe 95, and the tip of the probe 95 is provided with a temperature sensor 96 (temperature sensor) for measuring the temperature of the lubricant oil. The tip of the probe 95 is disposed below the oil level 40 of the lubricant oil stored in the lubricant oil storage part 34, so the temperature sensor 96 of the thermometer 94 is disposed below the oil level 40 of the lubricant stored in the lubricant oil storage part 34. The height Y from the upper surface 47 of the bottom lid 46 of the lubricant oil storage part 34 to the tip of the probe 95 of the thermometer 94 is different from the height X from the upper surface 47 of the bottom lid 46 of the lubricant oil storage part 34 to the tip of the probe 37.

In the configuration shown in FIG. 13, since the thermometer 36 and the thermometer 94 are disposed at different positions from each other in the circumferential direction of the protruding pipe 48, even when the turbocharger 2 is, for example, for marine use and is tilted, it is easy to keep the temperature sensor of any of the thermometers below the oil level 40 of the lubricant oil storage part 34. Further, it is possible to accurately measure the temperature of the lubricant oil at multiple height positions, for example, the temperature of the lubricant oil near the oil level 40 in the lubricant oil storage part 34 and the temperature of the lubricant oil near the bottom lid 46 in the lubricant oil storage part 34. Three or more thermometers may be provided in the lubricant oil storage part 34.

Figure 14:
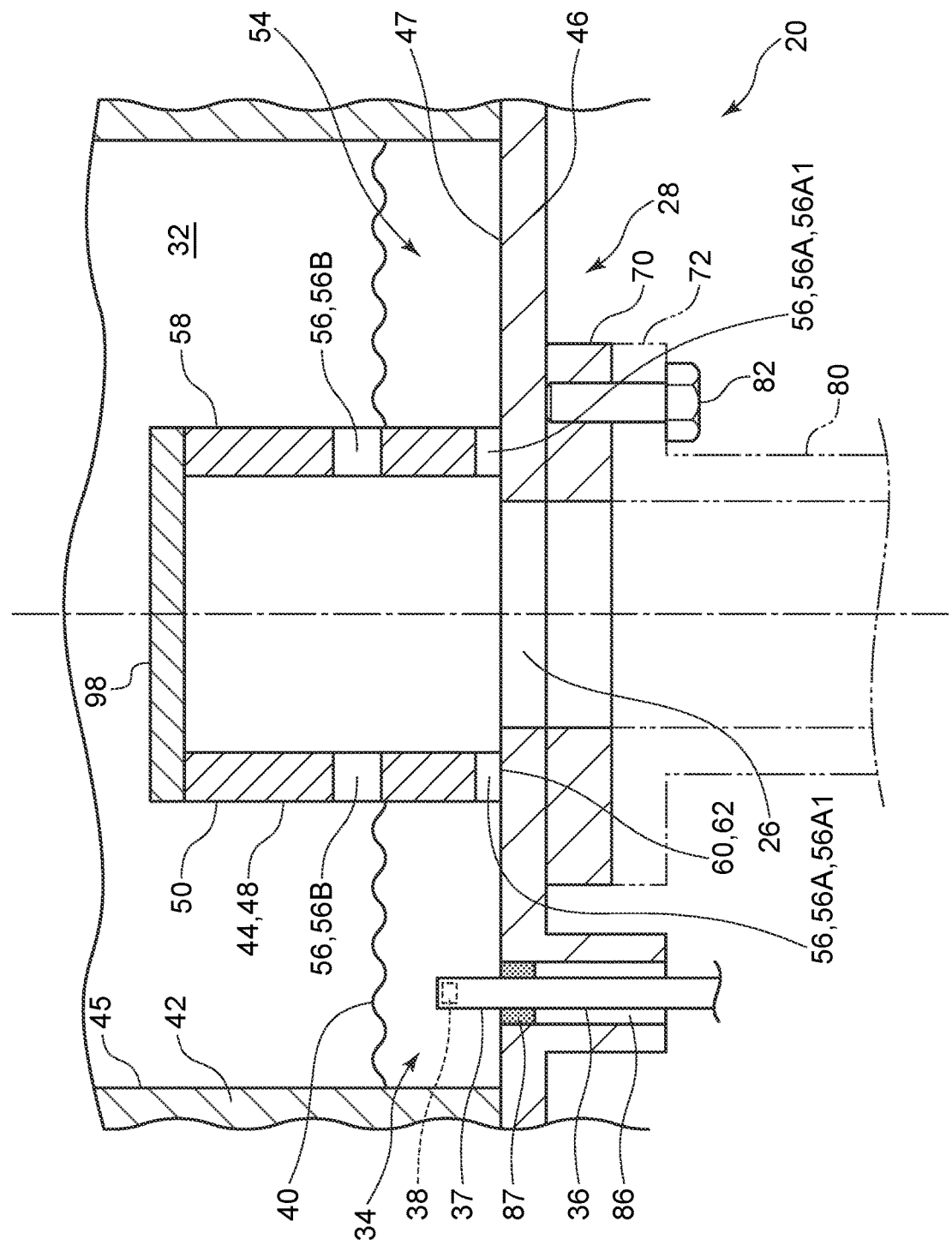
FIG. 14 is a schematic cross-sectional view showing another configuration example in the vicinity of the lubricant oil discharge part 28 in FIG. 1.

In some embodiments, for example as shown in FIG. 14, the lubricant oil discharge part 28 of the bearing pedestal 20 further includes a lid part 98 covering the opening in the upper end portion of the protruding pipe 48. In the configuration shown in FIG. 14, the protruding pipe 48 includes a plurality of lower oil drain holes 56A that penetrate the wall surface 58 of the lower portion 60 of the protruding pipe 48 and a plurality of upper oil drain holes 56B that penetrate the wall surface 58 of the protruding pipe 48 at a position above the plurality of lower oil drain holes 56A. The upper oil drain holes 56 are arranged at the same height at intervals in the circumferential direction of the protruding pipe 48.

Here, the hole diameter of the upper oil drain hole 56B is larger than the hole diameter of the lower oil drain hole 56A. Additionally, the sum of the total cross-sectional area (passage cross-sectional area) of all the lower oil drain holes 56A formed in the protruding pipe 48 and the total cross-sectional area (passage cross-sectional area) of all the upper oil drain holes 56B formed in the protruding pipe 48 is equal to or larger than the cross-sectional area (passage cross-sectional area) of the lubricant oil outlet 26. In other words, the sum of the total cross-sectional area of all the lower oil drain holes 56A formed in the protruding pipe 48 and the total cross-sectional area of all the upper oil drain holes 56B formed in the protruding pipe 48 is equal to the cross-sectional area of the lubricant oil outlet 26 or is larger than the cross-sectional area of the lubricant oil outlet 26. In the case where the passage cross-sectional area of each hole is not constant, the cross-sectional area of the hole means the minimum value of the passage cross-sectional area of the hole.

In the configuration shown in FIG. 14, since the lid part 98 covers the opening in the upper end portion of the protruding pipe 48, it is possible to prevent the lubricant oil falling from above (from the bearings 17 to 19) from entering the protruding pipe 48 without passing through the lubricant oil storage part 34. This ensures that the lubricant oil from above always falls once into the lubricant oil storage part 34 and facilitates storing the lubricant oil in the lubricant oil storage part 34. Further, since the lubricant oil always passes through the lubricant oil storage part 34, the lubricant oil is agitated in the lubricant oil storage part 34, and the oil temperature is equalized. Thus, it is possible to accurately measure the average temperature of the entire lubricant oil.

Further, by providing the upper oil drain hole 56B of appropriate size larger than the lower oil drain hole 56A above the lower oil drain hole 56A, the height of the oil level 40 of the lubricant oil in the lubricant oil storage part 34 can be maintained at the height of the upper oil drain hole 56B. Thus, it is possible to suppress the rising of the oil level 40 of the lubricant oil in the lubricant oil storage part 34 to an undesirable height position (e.g., the height position of any of the bearings 17 to 19 of the turbocharger 2, the height position of the shaft 3 of the turbocharger 2, or the height position of a seal part (not shown) to prevent the leakage of lubricant oil).

The lubricant oil outlet 26 of the turbocharger 2 has a cross-sectional area that allows the maximum flow rate of the lubricant oil specified in the turbocharger 2 to flow without any hindrance. By making the sum of the total cross-sectional area of the lower oil drain holes 56A and the total cross-sectional area of the upper oil drain holes 56B larger than the lubricant oil outlet 26 having such a cross-sectional area, the height of the oil level 40 of the lubricant oil in the lubricant oil storage part 34 can be limited to the height of the upper oil drain holes 56B even when the maximum flow rate of the lubricant oil specified in the turbocharger 2 flows. Thus, it is possible to suppress the rising of the oil level 40 of the lubricant oil in the lubricant oil storage part 34 to the undesirable height position as described above.

The present disclosure is not limited to the embodiments described above, but includes modifications to the embodiments described above, and embodiments composed of combinations of those embodiments.

Figure 15:
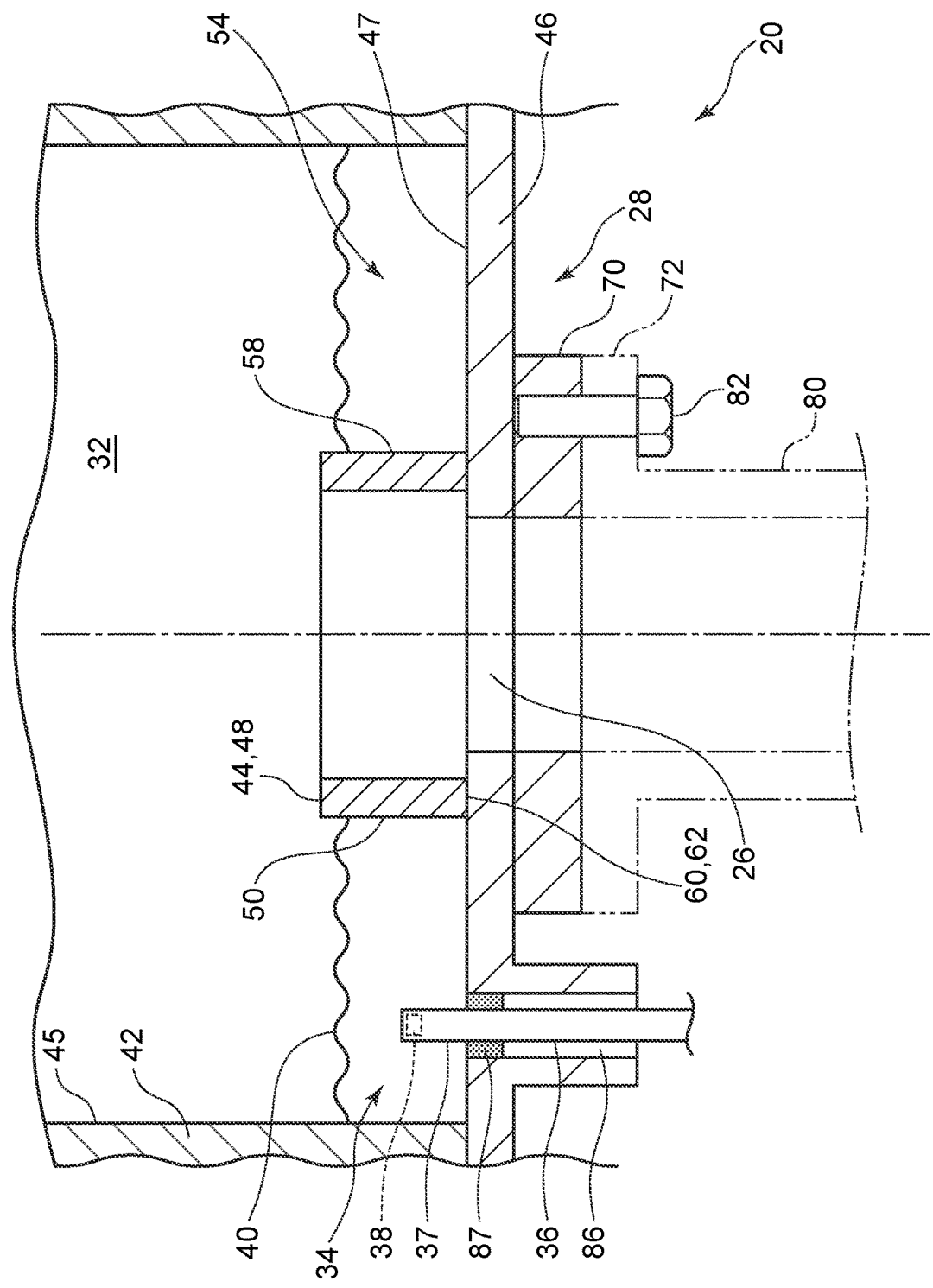
FIG. 15 is a schematic cross-sectional view showing another configuration example in the vicinity of the lubricant oil discharge part 28 in FIG. 1.

For example, as shown in FIG. 15, no oil drain hole 56 may be formed in the protruding pipe 48. In this case, for example, the mounting hole 86 shown in FIG. 15 may be used as the oil drain hole for discharging the lubricant oil from the lubricant oil storage part 34, or other oil drain holes may be provided in the casing part 45 or the bottom lid 46 to discharge the lubricant oil from the lubricant oil storage part 34. Further, in this case, the lubricant oil discharged from the oil drain hole may be supplied to the oil outlet pipe 80.

For example, in the configuration shown in FIG. 2, etc., multiple oil drain holes 56 (lower oil drain holes 56A or lower end oil drain holes 56A1) are provided at intervals in the circumferential direction, but the number of oil drain holes 56 may be only one, or at least one.

In the configuration shown in FIG. 14, multiple lower oil drain holes 56A (lower end oil drain holes 56A1) are provided at intervals in the circumferential direction, but the number of lower oil drain holes 56A (lower end oil drain holes 56A1) may be only one, or at least one. Further, multiple upper oil drain holes 56B are provided at intervals in the circumferential direction, but the number of upper oil drain holes 56B may be only one, or at least one.

The contents described in the above embodiments would be understood as follows, for instance.

(1) A turbocharger (e.g., the above-described turbocharger 2) according to the present disclosure includes: a bearing (e.g., the above-described bearings 17, 18, 19) supplied with lubricant oil; a casing (e.g., the above-described bearing pedestal 20) for accommodating the bearing; and a first thermometer (e.g., the above-described thermometer 36) including a first temperature sensor (e.g., the above-described temperature sensor 38) for measuring temperature of the lubricant oil. The casing includes a lubricant oil discharge part (e.g., the above-described lubricant oil discharge part 28) having a lubricant oil outlet (e.g., the above-described lubricant oil outlet) for discharging the lubricant oil from the turbocharger. The lubricant oil discharge part includes a lubricant oil storage part (e.g., the above-described lubricant oil storage part 34) for storing the lubricant oil. The first temperature sensor is disposed in the lubricant oil storage part.

With the turbocharger described in the above (1), since the first temperature sensor is disposed in the lubricant oil storage part, the lubricant oil stored in the lubricant oil storage part prevents the first temperature sensor from being exposed to air. In other words, the first temperature sensor can be placed in an oil-tight condition. Thus, the outlet temperature of the lubricant oil in the turbocharger can be measured stably and accurately. Further, with the lubricant oil storage part, the lubricant oil falls once and mixes in the lubricant oil storage part, equalizing the temperature of the entire lubricant oil to some extent. Therefore, unevenness in the temperature of the lubricant oil measured by the first temperature sensor can be suppressed, and the average temperature of the lubricant oil can be measured.

(2) In some embodiments, in the turbocharger described in the above (1), the lubricant oil storage part includes at least one oil drain hole (e.g., the above-described oil drain holes 56, lower oil drain holes 56A, lower end oil drain holes 56A1, and upper oil drain holes 56B) for discharging the lubricant oil from the lubricant oil storage part.

With the turbocharger described in the above (2), by discharging the lubricant oil stored in the lubricant oil storage part through the oil drain hole, the lubricant oil is prevented from remaining in the lubricant oil storage part, and the replacement of the lubricant oil in the lubricant oil storage part can be promoted. Therefore, it is possible to accurately measure the temperature of the lubricant oil which reflects the state of the bearings well.

If old lubricant oil continues to remain in the lubricant oil storage part, the oil quality of the lubricant oil line deteriorates when the old lubricant oil flows out of the lubricant oil storage part for some reason. However, with the configuration described in the above (2), the replacement of the lubricant oil in the lubricant oil storage part can be promoted, so that the deterioration of lubricant oil quality can be suppressed.

(3) In some embodiments, in the turbocharger described in the above (1) or (2), the first thermometer includes a first probe (e.g., the above-described probe 37) having the first temperature sensor at a tip side. The tip of the first probe is disposed below an oil level of the lubricant oil stored in the lubricant oil storage part.

With the turbocharger described in the above (3), since the tip of the first probe is disposed below the oil level of the lubricant oil stored in the lubricant oil storage part, the lubricant oil stored in the lubricant oil storage part prevents the temperature sensor of the first temperature sensor from being exposed to air. In other words, at least a part of the first temperature sensor can be placed in an oil-tight condition. Thus, the outlet temperature of the lubricant oil in the turbocharger can be measured stably and accurately.

(4) In some embodiments, in the turbocharger described in any one of the above (1) to (3), the lubricant oil storage part includes a protruding pipe (e.g., the above-described protruding pipe 48) that protrudes upward from the lubricant oil outlet. The lubricant oil storage part is configured to store the lubricant oil between an outer peripheral surface of the protruding pipe and an inner surface of the lubricant oil discharge part.

With the turbocharger described in the above (4), the lubricant oil can be stored around the lubricant oil outlet in the lubricant oil discharge part with a simple configuration. Thus, the outlet temperature of the lubricant oil in the turbocharger can be measured accurately with a simple configuration.

(5) In some embodiments, in the turbocharger described in the above (4), an inner diameter (e.g., the above-described inner diameter D1) of the protruding pipe is larger than a diameter (e.g., the above-described inner diameter DO) of the lubricant oil outlet.

With the turbocharger described in the above (5), it is possible to suppress the leakage of lubricant oil caused by damage to a weld portion in the case where the protruding pipe and the lubricant oil outlet are connected by welding.

(6) In some embodiments, in the turbocharger described in the above (4) or (5), the lubricant oil storage part includes at least one oil drain hole (e.g., the above-described oil drain holes 56, lower oil drain holes 56A, lower end oil drain holes 56A1, and upper oil drain holes 56B) for discharging the lubricant oil from the lubricant oil storage part. The at least one oil drain hole is configured to penetrate a wall surface of the protruding pipe.

With the turbocharger described in the above (6), by discharging the lubricant oil stored in the lubricant oil storage part through the oil drain hole of the protruding pipe, the lubricant oil is prevented from remaining in the lubricant oil storage part with a simple configuration, and the replacement of the lubricant oil in the lubricant oil storage part can be promoted. Therefore, it is possible to accurately measure the temperature of the lubricant oil which reflects the state of the bearings of the turbocharger well with a simple configuration. Further, by promoting the replacement of the lubricant oil in the lubricant oil storage part, it is possible to suppress the deterioration of lubricant oil quality.

(7) In some embodiments, in the turbocharger described in the above (6), the at least one oil drain hole includes at least one lower oil drain hole (e.g., the above-described lower oil drain holes 56A) configured to penetrate a wall surface of a lower portion of the protruding pipe.

With the turbocharger described in the above (7), by providing the lower oil drain hole in the lower portion of the protruding pipe, gravity can be used to effectively promote the replacement of the lubricant oil in the lubricant oil storage part. Therefore, it is possible to accurately measure the temperature of the lubricant oil which reflects the state of the bearings well with a simple configuration. Further, it is possible to effectively suppress the deterioration of lubricant oil quality.

(8) In some embodiments, in the turbocharger described in the above (7), the at least one lower oil drain hole includes at least one lower end oil drain hole (e.g., the above-described lower end oil drain holes 56A1) provided at a lower end of the protruding pipe.

With the turbocharger described in the above (8), by providing the lower end oil drain hole at the lower end of the protruding pipe, gravity can be used to effectively promote the replacement of the lubricant oil in the lubricant oil storage part. Further, by discharging the lubricant oil in the lubricant oil storage part through the lower end oil drain hole when the operation of the turbocharger is stopped, the lubricant oil in the lubricant oil storage part can be almost empty. Thus, old lubricant oil is prevented from remaining at the bottom of the lubricant oil storage part, which prevents the accuracy of lubricant oil temperature measurement from decreasing, and when a ship is in motion, etc., the deteriorated lubricant oil remaining at the bottom from circulating throughout a lubricant oil line, affecting bearing lubrication and other functions. Further, it is possible to reduce the outflow of oil from the lubricant oil storage part, for example, when disassembling the casing (e.g., if the lubricant oil storage part has a bottom lid, when removing the bottom lid). In addition to when removing the bottom lid, for example, when removing (replacing) the temperature sensor or transporting the turbocharger, it is possible to reduce the outflow of oil from the lubricant oil storage part.

(9) In some embodiments, in the turbocharger described in the above (8), the at least one lower end oil drain hole is formed to gouge an upper surface of a bottom wall (e.g., the above-described bottom lid 46) of the lubricant oil discharge part.

With the turbocharger described in the above (9), the lubricant oil can be discharged from the lubricant oil storage part more efficiently.

(10) In some embodiments, in the turbocharger described in any one of the above (7) to (9), a total cross-sectional area of all the lower oil drain holes provided in the protruding pipe is smaller than a cross-sectional area of the lubricant oil outlet.

With the turbocharger described in the above (10), the lubricant oil can be effectively stored in the lubricant oil storage part, and the outlet temperature of the lubricant oil in the turbocharger can be measured stably and accurately.

(11) In some embodiments, in the turbocharger described in any one of the above (7) to (10), a total cross-sectional area of all the lower oil drain holes provided in the protruding pipe is such that a total flow rate of the lubricant oil flowing through all the lower oil drain holes in the protruding pipe is equal to or less than 70% of a minimum flow rate of the lubricant oil supplied to the turbocharger during operation of the turbocharger.

With the turbocharger described in the above (11), even when the flow rate of the lubricant oil supplied to the turbocharger is the minimum flow rate specified in the turbocharger, lubricant oil can be stored in the lubricant oil storage part, and the outlet temperature of the lubricant oil in the turbocharger can be measured stably and accurately.

(12) In some embodiments, in the turbocharger described in any one of the above (6) to (11), the first thermometer includes a first probe having the first temperature sensor at a tip side. The first thermometer is arranged with the tip side of the first probe tilted toward the protruding pipe with respect to a vertical direction.

With the turbocharger described in the above (12), the first temperature sensor can be brought closer to the oil drain hole in the protruding pipe to measure the temperature of lubricant oil near the oil drain hole (i.e., lubricant oil not stagnating in the lubricant oil storage part), while suppressing interference of the base end of the first probe (opposite the temperature sensor) with flanges or pipes connected to the lubricant oil outlet. Therefore, it is possible to accurately measure the temperature of the lubricant oil which reflects the state of the bearings well, while suppressing interference of the base end of the first probe with flanges or pipes connected to the lubricant oil outlet.

(13) In some embodiments, in the turbocharger described in any one of the above (6) to (12), an upper surface of a bottom wall of the lubricant oil storage part includes an inclined surface (e.g., the above-described inclined surface 88) that is inclined downward toward the protruding pipe.

With the turbocharger described in the above (13), since the lubricant oil can be guided along the inclined surface to the oil drain hole of the protruding pipe, the lubricant oil can be discharged more efficiently, and the replacement of the lubricant oil in the lubricant oil storage part can be promoted. Thus, it is possible to accurately measure the temperature of the lubricant oil which reflects the state of the bearings.

(14) In some embodiments, in the turbocharger described in any one of the above (6) to (13), the at least one oil drain hole includes a plurality of oil drain holes (e.g., the above-described oil drain holes 56, lower oil drain holes 56A, lower end oil drain holes 56A1, upper oil drain holes 56B) provided at intervals in a circumferential direction of the protruding pipe.

With the turbocharger described in the above (14), even when the turbocharger is, for example, for marine use and is tilted, the remaining amount of lubricant oil in the lubricant oil storage part can be close to empty when the operation of the turbocharger is stopped.

(15) In some embodiments, in the turbocharger described in any one of the above (4) to (14), the turbocharger includes a second thermometer (e.g., the above-described thermometer 94) including a second temperature sensor (e.g., the above-described temperature sensor 96) for measuring temperature of the lubricant oil. At least a part of the second temperature sensor is disposed in the lubricant oil storage part. The second thermometer is disposed at a different position from the first thermometer in a circumferential direction of the protruding pipe.

With the turbocharger described in the above (15), since the first thermometer and the second thermometer are disposed at different positions from each other in the circumferential direction, even when the turbocharger is, for example, for marine use and is tilted, it is easy to keep the temperature sensor of any of the thermometers below the oil level of the lubricant oil storage part. The lubricant oil outlet temperature measuring device may be equipped with three or more thermometers disposed at different positions from each other in the circumferential direction of the protruding pipe.

(16) In some embodiments, in the turbocharger described in the above (15), the first thermometer includes a first probe (e.g., the above-described probe 37) having the first temperature sensor at a tip side. The second thermometer includes a second probe (e.g., the above-described probe 95) having the second temperature sensor at a tip side. A height (e.g., the above-described height X) from an upper surface of a bottom wall of the lubricant oil storage part to the tip of the first probe is different from a height (e.g., the above-described height Y) from the upper surface of the bottom wall of the lubricant oil storage part to the tip of the second probe.

With the turbocharger described in the above (16), it is possible to accurately measure the temperature of the lubricant oil at multiple height positions, for example, the temperature of the lubricant oil near the oil level in the lubricant oil storage part and the temperature of the lubricant oil near the bottom of the lubricant oil storage part.

(17) In some embodiments, in the turbocharger described in any one of the above (4) to (14), the first thermometer includes a first probe having the first temperature sensor at a tip side. The tip of the first probe is disposed below an upper end of the protruding pipe.

With the turbocharger described in the above (17), the tip of the first probe can be placed below the oil level of the lubricant oil in the lubricant oil storage part when the lubricant oil is stored in the lubricant oil storage part to the height of the upper end of the protruding pipe, so that the temperature of the lubricant oil can be measured accurately by preventing the first temperature sensor from being exposed to air.

(18) In some embodiments, in the turbocharger described in any one of the above (4) to (14), the first thermometer includes a first probe having the first temperature sensor at a tip side, and the following expression (a) is satisfied:

$$X < A - B \tan \theta \tag{a}$$

where X is a height from a bottom wall of the lubricant oil storage part to the tip of the first probe, A is a height from a bottom surface of the lubricant oil storage part to the tip of the protruding pipe, B is a distance between an inner peripheral surface of the protruding pipe and the tip of the first probe at a position furthest from the first thermometer in a circumferential direction of the protruding pipe, and $\theta$ is a maximum inclination angle specified by ship classification or a maximum inclination angle conceivable in design of a ship or an engine, whichever is greater.

With the turbocharger described in the above (18), even when the turbocharger is tilted at the maximum inclination angle specified by ship classification or the maximum inclination angle conceivable in design of a ship or an engine, whichever is greater, the tip of the first thermometer is prevented from protruding from the oil level. Thus, the part of the first thermometer disposed in the lubricant oil storage part is prevented from being exposed to air, and the outlet temperature of the lubricant oil in the turbocharger can be measured stably and accurately.

(19) In some embodiments, in the turbocharger described in any one of the above (6) to (14), the turbocharger further includes a lid part (e.g., the above-described lid part 98) for covering an opening in an end portion of the protruding pipe.

With the turbocharger described in the above (19), since the lid part covers the opening in the end portion of the protruding pipe, it is possible to prevent the lubricant oil falling from above from entering the protruding pipe without passing through the lubricant oil storage part between the outer peripheral surface of the protruding pipe and the inner surface of the lubricant oil discharge part. This ensures that the lubricant oil from above always falls once into the lubricant oil storage part and facilitates storing the lubricant oil in the lubricant oil storage part. Further, since the lubricant oil always passes through the lubricant oil storage part, the lubricant oil is agitated in the lubricant oil storage part, and the oil temperature is equalized. Thus, it is possible to accurately measure the average temperature of the entire lubricant oil.

(20) In some embodiments, in the turbocharger described in the above (19), the at least one oil drain hole includes at least one lower oil drain hole (e.g., the above-described lower oil drain holes 56A, lower end oil drain holes 56A1) that penetrates a wall surface of a lower portion of the protruding pipe and at least one upper oil drain hole (e.g., the above-described upper oil drain holes 56B) that penetrates a wall surface of the protruding pipe at a position above the at least one lower oil drain hole.

With the turbocharger described in the above (20), by providing the lower oil drain hole in the lower portion of the protruding pipe, gravity can be used to effectively promote the replacement of the lubricant oil in the lubricant oil storage part. Therefore, it is possible to accurately measure the temperature of the lubricant oil which reflects the state of the bearings of the turbocharger well with a simple configuration. Further, by providing the upper oil drain hole of appropriate size above the lower oil drain hole, the height of the oil level of the lubricant oil in the lubricant oil storage part can be limited to the height of the upper oil drain hole. Thus, it is possible to suppress the rising of the oil level of the lubricant oil in the lubricant oil storage part to an undesirable height position (e.g., the height position of the bearing of the turbocharger, the height position of the shaft of the turbocharger, or the height position of a seal part to prevent the leakage of lubricant oil).

(21) In some embodiments, in the turbocharger described in the above (20), a hole diameter of the at least one upper oil drain hole is larger than a hole diameter of the at least one lower oil drain hole.

With the turbocharger described in the above (21), by providing the upper oil drain hole of appropriate diameter larger than the lower oil drain hole above the lower oil drain hole, the height of the oil level of the lubricant oil in the lubricant oil storage part can be limited to the height of the upper oil drain hole. Thus, it is possible to suppress the rising of the oil level of the lubricant oil in the lubricant oil storage part to the undesirable height position as described above.

(22) In some embodiments, in the turbocharger described in the above (20) or (21), the first thermometer includes a first probe having the first temperature sensor at a tip side. The tip of the first probe is disposed between the lower oil drain hole and the upper oil drain hole in a height direction.

With the turbocharger described in the above (22), the tip of the first probe can be placed below the oil level of the lubricant oil in the lubricant oil storage part when the lubricant oil is stored in the lubricant oil storage part to the height of the upper oil drain hole, so that the temperature of the lubricant oil can be measured accurately by preventing the first temperature sensor from being exposed to air.

(23) In some embodiments, in the turbocharger described in any one of the above (20) to (22), the sum of a total cross-sectional area of all the lower oil drain holes formed in the protruding pipe and a total cross-sectional area of all the upper oil drain holes formed in the protruding pipe is equal to or larger than a cross-sectional area of the lubricant oil outlet.

With the turbocharger described in the above (23), the lubricant oil outlet of the turbocharger has a cross-sectional area that allows the maximum flow rate of the lubricant oil specified in the turbocharger to flow without any hindrance. By making the sum of the total cross-sectional area of the lower oil drain holes and the total cross-sectional area of the upper oil drain holes equal to or larger than the lubricant oil outlet having such a cross-sectional area, the height of the oil level of the lubricant oil in the lubricant oil storage part can be limited to the height of the upper oil drain hole even when the maximum flow rate of the lubricant oil specified in the turbocharger flows. Thus, it is possible to suppress the rising of the oil level of the lubricant oil in the lubricant oil storage part to the undesirable height position as described above.

REFERENCE SIGNS LIST

2 Turbocharger
3 Shaft
4 Turbine
6 Compressor
8 Bearing device
10 Turbine wheel
12 Turbine casing
14 Compressor impeller
16 Compressor casing
17, 18 Journal bearing
19 Thrust bearing
20 Bearing pedestal
22 Lubricant oil inlet
24 Lubricant oil receiving part
26 Lubricant oil outlet
28 Lubricant oil discharge part
32 Cavity
34 Lubricant oil storage part
36 Thermometer
37 Probe
38 Temperature sensor
40 Oil level
42 Inner peripheral surface
45 Casing part
46 Bottom lid
47 Upper surface
48 Protruding pipe
50 Outer peripheral surface
54 Recess
56 Oil drain hole
56A Lower oil drain hole
56A1 Lower end oil drain hole
56B Upper oil drain hole
58 Wall surface
60 Lower portion
62 Lower end
70, 72 Flange
74, 78, 84, 85 Weld portion
76 Inner peripheral surface
80 Oil outlet pipe
82 Bolt
83 Bolt hole
86 Mounting hole
87 Seal member
88 Inclined surface
90 Flat plate portion
92 Inclined plate portion
94 Thermometer
95 Probe
96 Temperature sensor
98 Lid part

The invention claimed is:

1. A turbocharger, comprising:
a bearing supplied with lubricant oil;
a casing for accommodating the bearing; and
a first thermometer including a first temperature sensor for measuring temperature of the lubricant oil,
wherein the casing includes a lubricant oil discharge part having a lubricant oil outlet for discharging the lubricant oil from the turbocharger,
wherein the lubricant oil discharge part includes a lubricant oil storage part for storing the lubricant oil,
wherein the lubricant oil storage part is provided below the bearing so as to store the lubricant oil fallen from the bearing, and
wherein the first temperature sensor is disposed in the lubricant oil storage part.

2. The turbocharger according to claim 1,
wherein the lubricant oil storage part includes at least one oil drain hole for discharging the lubricant oil from the lubricant oil storage part.

3. The turbocharger according to claim 1,
wherein the first thermometer includes a first probe having the first temperature sensor at a tip side, and wherein the tip of the first probe is disposed below an oil level of the lubricant oil stored in the lubricant oil storage part.

4. The turbocharger according to claim 1,
wherein the lubricant oil discharge part includes a bottom lid through which the lubricant oil outlet is formed, a first wall portion protruding upward from the bottom lid, and a second wall portion protruding upward from the bottom lid and forming a cavity communicating with the lubricant oil outlet between the first wall portion and the second wall portion,
wherein the bottom lid, the first wall portion, and the second wall portion are located below the bearing, and the lubricant oil storage part is configured to store the lubricant oil between the first wall portion and the second wall portion.

5. A turbocharger, comprising:
a bearing supplied with lubricant oil;
a casing for accommodating the bearing; and a first thermometer including
a first temperature sensor for measuring temperature of the lubricant oil,
wherein the casing includes a lubricant oil discharge part having a lubricant oil outlet for discharging the lubricant oil from the turbocharger,
wherein the lubricant oil discharge part includes a lubricant oil storage part for storing the lubricant oil,
wherein the first temperature sensor is disposed in the lubricant oil storage part,
wherein the lubricant oil storage part includes a protruding pipe that protrudes upward from the lubricant oil outlet, and
wherein the lubricant oil storage part is configured to store the lubricant oil between an outer peripheral surface of the protruding pipe and an inner surface of the lubricant oil discharge part.

6. The turbocharger according to claim 5,
wherein an inner diameter of the protruding pipe is larger than a diameter of the lubricant oil outlet.

7. The turbocharger according to claim 5,
wherein the lubricant oil storage part includes at least one oil drain hole for discharging the lubricant oil from the lubricant oil storage part, and
wherein the at least one oil drain hole is configured to penetrate a wall surface of the protruding pipe.

8. The turbocharger according to claim 7,
wherein the at least one oil drain hole includes at least one lower oil drain hole configured to penetrate a wall surface of a lower portion of the protruding pipe.

9. The turbocharger according to claim 8,
wherein the at least one lower oil drain hole includes at least one lower end oil drain hole provided at a lower end of the protruding pipe.

10. The turbocharger according to claim 9,
wherein the at least one lower end oil drain hole is formed to gouge an upper surface of a bottom wall of the lubricant oil discharge part.

11. The turbocharger according to claim 8,
wherein a total cross-sectional area of all the lower oil drain holes provided in the protruding pipe is smaller than a cross-sectional area of the lubricant oil outlet.

12. The turbocharger according to claim 8,
wherein a total cross-sectional area of all the lower oil drain holes provided in the protruding pipe is such that a total flow rate of the lubricant oil flowing through all the lower oil drain holes in the protruding pipe is equal to or less than 70% of a minimum flow rate of the lubricant oil supplied to the turbocharger during operation of the turbocharger.

13. The turbocharger according to claim 7,
wherein the first thermometer includes a first probe having the first temperature sensor at a tip side, and the first thermometer is arranged with the tip side of the first probe tilted toward the protruding pipe with respect to a vertical direction.

14. The turbocharger according to claim 7,
wherein an upper surface of a bottom wall of the lubricant oil storage part includes an inclined surface that is inclined downward toward the protruding pipe.

15. The turbocharger according to claim 7,
wherein the at least one oil drain hole includes a plurality of oil drain holes provided at intervals in a circumferential direction of the protruding pipe.

16. The turbocharger according to claim 5, comprising a second thermometer including a second temperature sensor for measuring temperature of the lubricant oil,
wherein at least a part of the second temperature sensor is disposed in the lubricant oil storage part, and
wherein the second thermometer is disposed at a different position from the first thermometer in a circumferential direction of the protruding pipe.

17. The turbocharger according to claim 16,
wherein the first thermometer includes a first probe having the first temperature sensor at a tip side,
wherein the second thermometer includes a second probe having the second temperature sensor at a tip side, and
wherein a height from an upper surface of a bottom wall of the lubricant oil storage part to the tip of the first probe is different from a height from the upper surface of the bottom wall of the lubricant oil storage part to the tip of the second probe.

18. The turbocharger according to claim 5,
wherein the first thermometer includes a first probe having the first temperature sensor at a tip side, and
wherein the tip of the first probe is disposed below an upper end of the protruding pipe.

19. The turbocharger according to claim 5,
wherein the first thermometer includes a first probe having the first temperature sensor at a tip side, and
wherein the following expression (a) is satisfied:

$$X < A - B \tan \theta \qquad (a)$$

where X is a height from a bottom wall of the lubricant oil storage part to the tip of the first probe, A is a height from a bottom surface of the lubricant oil storage part to the tip of the protruding pipe, B is a distance between an inner peripheral surface of the protruding pipe and the tip of the first probe at a position furthest from the first thermometer in a circumferential direction of the protruding pipe, and θ is a maximum inclination angle specified by ship classification or a maximum inclination angle conceivable in design of a ship or an engine, whichever is greater.

20. The turbocharger according to claim 7, further comprising a lid part for covering an opening in an end portion of the protruding pipe.

21. The turbocharger according to claim 20,
wherein the at least one oil drain hole includes at least one lower oil drain hole that penetrates a wall surface of a lower portion of the protruding pipe and at least one upper oil drain hole that penetrates a wall surface of the protruding pipe at a position above the at least one lower oil drain hole.

22. The turbocharger according to claim 21,
wherein a hole diameter of the at least one upper oil drain hole is larger than a hole diameter of the at least one lower oil drain hole.

23. The turbocharger according to claim 21,
wherein the first thermometer includes a first probe having the first temperature sensor at a tip side, and
wherein the tip of the first probe is disposed between the lower oil drain hole and the upper oil drain hole in a height direction.

24. The turbocharger according to claim 21,
wherein the sum of a total cross-sectional area of all the lower oil drain holes formed in the protruding pipe and a total cross-sectional area of all the upper oil drain holes formed in the protruding pipe is equal to or larger than a cross-sectional area of the lubricant oil outlet.

\* \* \* \* \*